(12) United States Patent
Elrayess et al.

(10) Patent No.: US 12,517,140 B2
(45) Date of Patent: Jan. 6, 2026

(54) BIOMARKERS FOR PREDICTING INTENSIVE CARE UNIT STAY DURATION FOR MECHANICALLY VENTILATED COVID-19 PATIENTS

(71) Applicant: QATAR UNIVERSITY, Doha (QA)

(72) Inventors: Mohamed Elrayess, Doha (QA); Asmaa Al-Thani, Doha (QA); Hadi Yassine, Doha (QA)

(73) Assignee: QATAR UNIVERSITY, Doha (QA)

( * ) Notice: Subject to any disclaimer, the term of this patent is extended or adjusted under 35 U.S.C. 154(b) by 940 days.

(21) Appl. No.: 17/719,338

(22) Filed: Apr. 12, 2022

(65) Prior Publication Data

US 2023/0043689 A1 Feb. 9, 2023

Related U.S. Application Data

(60) Provisional application No. 63/155,750, filed on Mar. 3, 2021.

(51) Int. Cl.
*G01N 33/68* (2006.01)

(52) U.S. Cl.
CPC ..... *G01N 33/6893* (2013.01); *G01N 2800/52* (2013.01); *G01N 2800/56* (2013.01)

(58) Field of Classification Search
CPC .......... G01N 33/6893; G01N 2800/52; G01N 2800/56; G16H 20/40; G16H 40/20; G16H 50/20; G16H 50/30; A61M 16/04; A61M 16/026; A61M 2205/3303; A61M 2230/20; A61M 2230/205; A61M 2230/207; A61M 2230/208
See application file for complete search history.

(56) References Cited

U.S. PATENT DOCUMENTS

| 2011/0161857 A1 | 6/2011 | Kramer |
| 2014/0136458 A1 | 5/2014 | Levin et al. |

FOREIGN PATENT DOCUMENTS

| WO | 2008/149103 A1 | 12/2008 |
| WO | 2012/150863 A1 | 11/2012 |
| WO | 2019/200251 A1 | 10/2019 |

OTHER PUBLICATIONS

International Search Report and Written Opinion issued in corresponding International Application No. PCT/IB2022/053500 on Jun. 15, 2022.
Tingting Dan et al., "Machine Learning to Predict ICU Admission, ICU Mortality and Survivors' Length of Stay Among COVID-19 Patients: Toward Optimal Allocation of ICU Resources", https://papers.ssrn.com/sol3/papers.cfm?abstract_id=3631305, 42 pages, Manuscript No. thelancetrm-D-20-01720.

(Continued)

*Primary Examiner* — Moshe Wilensky
(74) *Attorney, Agent, or Firm* — SQUIRE PATTON BOGGS (US) LLP

(57) ABSTRACT

The disclosure provides methods that facilitate disease management by providing for early detection of metabolic changes that differentiate critically ill-COVID-19 patients under mechanical ventilation at the intensive care unit (ICU) who are likely to exhibit faster recovery.

10 Claims, 29 Drawing Sheets
(10 of 29 Drawing Sheet(s) Filed in Color)

(56) References Cited

OTHER PUBLICATIONS

Sorin Draghici et al., "COVID-19: Disease Pathways and Gene Expression Changes Predict Methylprednisolone can Improve Outcome in Severe Cases", Bioinformatics, vol. 37, Issue 17, Sep. 1, 2021, pp. 2691-2698, https://doi.org/10.1093/bioinformatics/btab163, published Mar. 9, 2021.

Bo Shen et al., "Proteomic and Metabolomic Characterization of COVID-19 Patient Sera", Cell 182, pp. 59-72, Jul. 9, 2020, https://doi.org/10.1016/j.cell.2020.05.032.

| Metabolite | Estimate | SE | z value | P value |
|---|---|---|---|---|
| Creatinine | 0.7 | 0.2 | 3.3 | 0.001 |
| D-dimer | 0.8 | 0.2 | 3.9 | 8.32E-05 |
| 3-methylhistidine | -0.4 | 0.3 | -1.6 | 0.1 |
| lysoPC.a.C20.4 | -0.3 | 0.2 | -2.3 | 0.02 |

| Metabolite | Estimate | SE | z value | P value |
|---|---|---|---|---|
| Kynurenine | 0.4 | 0.1 | 7.6 | 4.37E-14 |
| 3-methylhistidine | -0.2 | 0.1 | -3.2 | 0.002 |
| Ornithine | -0.2 | 0.1 | -2.9 | 0.003 |
| p.cresol.SO4 | 0.2 | 0.1 | 3.1 | 0.003 |
| SM.C24:1 | -0.5 | 0.1 | -4.1 | 3.61E-05 |

BIOMARKERS FOR PREDICTING INTENSIVE CARE UNIT STAY DURATION FOR MECHANICALLY VENTILATED COVID-19 PATIENTS

REFERENCE TO RELATED APPLICATIONS

This application claims the benefit of priority to U.S. Provisional Patent Application No. 63/155,750, filed Mar. 3, 2021, the contents of which are incorporated by reference herein in its entirety.

BACKGROUND

Although critical illness is usually acute and short duration, some patients require prolonged management in intensive care units (ICU) and suffer long-term morbidity and mortality. For example, managing critically-ill patients at ICU, especially at times of disease peak when availability of respiratory ventilators at ICU can be a limiting factor. Thus, at times of pandemic crisis limited capacity for those who require long care can be particularly challenging. The conditions encountered in hospitals during the COVID-19 pandemic have brought these issues to the forefront.

The severe acute respiratory syndrome coronavirus 2 (SARS-CoV-2) remains a major threat worldwide, causing the coronavirus disease 2019 (COVID-19) pandemic that has endangered the lives of millions around the globe. One-fifth of COVID-19 patients exhibits respiratory distress that necessitates instant oxygen therapy or hospital interventions such as invasive mechanical ventilation (IMV). Among the critically-ill patients admitted to the intensive care unit (ICU), one-third of patients dies. At times of crises, intensivists are often inclined to predict the duration of IMV for a better utilization of ICU resources. However, the accuracy of early clinical prediction of IMV duration remains limited, especially in patients who will require longer IMV. In parallel, markers that can predict patients' evolution at ICU may also be legitimate targets for intervention to improve the patient clinical profile at ICU.

Current metabolomics approaches used to evaluate patients' disease severity typically compare the metabolic profile of healthy individuals to groups of COVID-19 patients with varying degrees of severity. Unfortunately, however, the value of these studies for disease management are limited because measurements are taken after the phenotypes were acquired, and thus are not predictive. Accordingly, there is a significant need for more effective predictive tools for differentiating, early on intubation, patients who are more likely to recover, from those who would sustain an extended stay at ICU. Ideally, such screening tools would also be easy to use and cost-effective so that they are widely accessible, thus improving patient outcome.

Fortunately, as will be clear from the detailed description that follows, the present disclosure provides for these and other needs.

SUMMARY OF INVENTION

In one aspect, the disclosure provides a method for predicting the length of stay (LOS) in an intensive care unit (ICU) for a patient under invasive mechanical ventilation (IMV), or for assessing the risk of a long stay in the ICU for a patient under invasive mechanical ventilation (IMV). The method comprises: determining the expression level of at least one metabolite in an isolated biological sample at a first time point, wherein the at least one metabolite is selected from the group consisting of hypoxanthine and betaine, and determining whether the at least one metabolite is differentially expressed compared to a reference sample, wherein differential expression of the at least one metabolite is an upregulation or a downregulation, and wherein differential expression of the metabolite predicts the length of stay for the patient, and treating the patient predicted to have a long stay in the ICU or having elevated risk of a long stay in the ICU, with a compound or other therapy to improve the prognosis for the patient and reduce the length of stay. In an embodiment, the biological sample is obtained within 48 hours of intubation. In an embodiment, the patient is selected from the group consisting of an influenza patient, a MERS patient, a SARS patient, and a critically ill COVID-19 patient. In an embodiment, the subject is a critically ill COVID-19 patient. In some embodiments, the reference sample is from a patient having a short stay in ICU.

In another aspect, the disclosure provides a method for predicting the duration of invasive mechanical ventilation (IMV) for a patient. The method comprises determining the expression level of at least one metabolite in an isolated biological sample at a first time point, wherein the at least one metabolite is selected from the group consisting of kynurenine, 3-methylhistidine, ornithine, p-cresol sulfate, and C24.0 sphingomyelin, and determining whether the at least one metabolite is differentially expressed compared to a reference sample, wherein differential expression of the at least one metabolite is an upregulation or a downregulation, and wherein differential expression of the metabolite predicts the duration of IMV for the patient, and treating the patient to reduce the predicted duration of IMV, with a compound or other therapy to improve the prognosis for the patient and reduce the duration of IMV. In an embodiment, the patient is selected from the group consisting of an influenza patient, a MERS patient, a SARS patient, and a critically ill COVID-19 patient. In an embodiment, the subject is a critically ill COVID-19 patient. In an embodiment, the reference sample is from an ICU patient intubated for less than one week, or an unintubated ICU patient. In an embodiment, the biological sample is obtained 1 week after intubation. In an embodiment, the kynurenine and p.Cresol.SO4 are elevated relative to the reference, and the levels of 3-methylhistidine, ornithine, and C24.0 sphingomyelin are lower than the reference. In an embodiment, the method further comprises predicting if the subject will progress to extracorporeal membrane oxygenation (ECMO).

Other features, objects and advantages will be apparent from the detailed description that follows.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
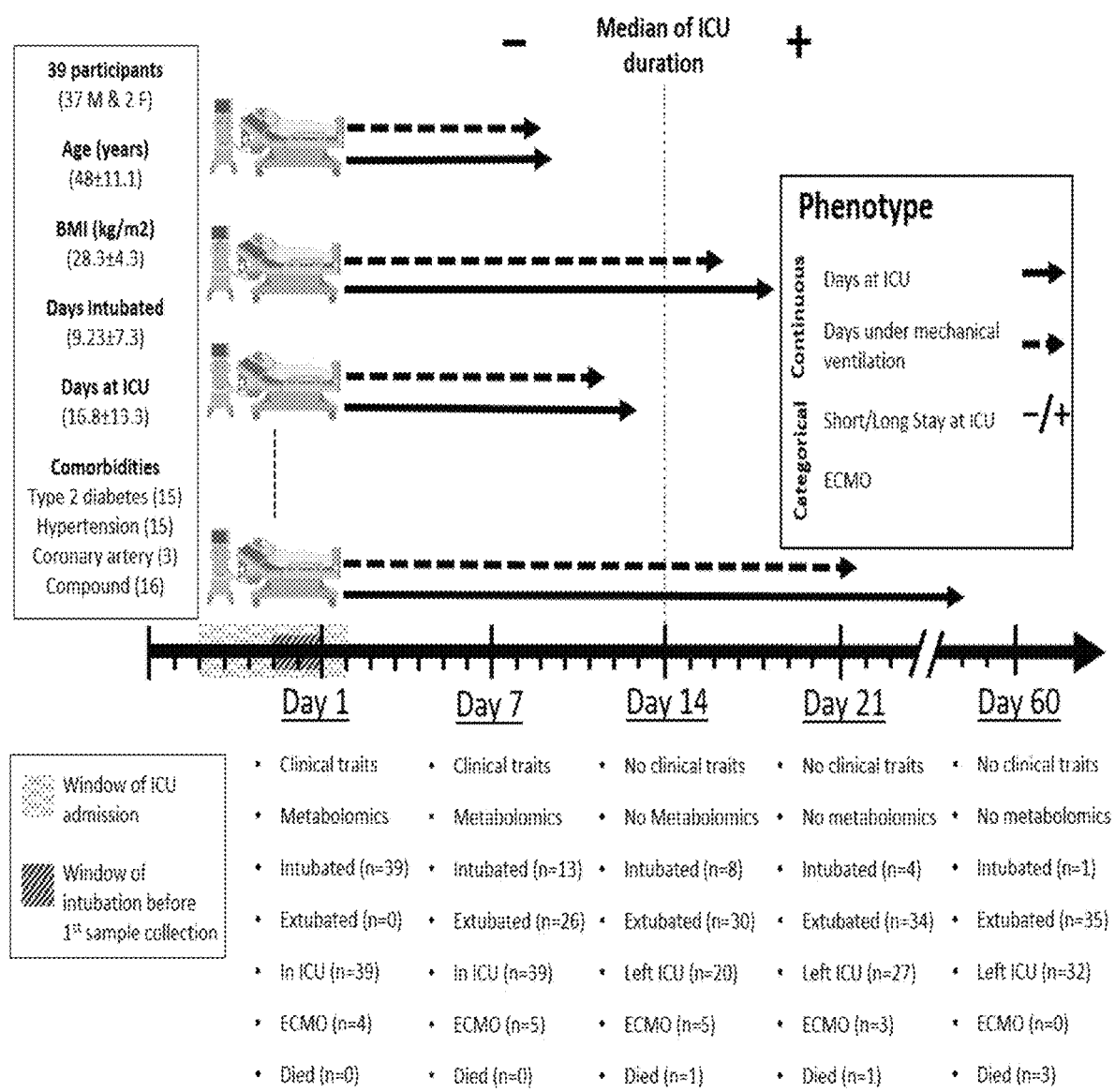
FIG. 1 provides a schematic representation of the study design. Day one represents the day of inclusion and first sample collection when all participants were already under mechanical ventilation. Patients' intubation started two days before to four days after ICU admission (window of intubation). Blood samples were collected from ICU patients one day before ICU admission to five days after ICU admission (window of ICU admission), then seven days later. Clinical and metabolic profiles were measured at day one and day seven and were correlated with four phenotypes: (1) two continuous (days at ICU and days under mechanical ventilation) and two categorical (short (≤14 days) or long (>14 days) stay at ICU and progression to extracorporeal membrane oxygenation (ECMO). Clinical outcomes were recorded at days one, seven, fourteen, twenty-one and sixty. Participants' data for age, BMI, days under mechanical ventilation and days at ICU are presented as mean±standard deviation (SD)

FIG. 2 (A) Predictive model of length of stay (LOS) categorized into short/long based on measurement from day one. OPLS-DA score plot from the whole cohort showing the class-discriminatory component (x-axis) versus the orthogonal confounding component (y-axis) for long versus short LOS groups, the discriminatory component explaining up to 86% of the variation in the Y phenotype variable.

FIG. 2 (B) Volcano plot showing significantly associated metabolites (log fold change >0.06, adjusted pvalue ≤0.05) differentiating long from short LOS groups from the linear model based on the training set.

FIG. 2 (C) A predictive model of LOS based on the training set showing perfect separation of patients with short versus long 1CU-stay from the same set (n=17).

FIG. 2 (D) The model featured two explanatory metabolites: hypoxanthine and betaine with independent effects.

FIG. 2 (E) Validation of the model using the prediction set (n=16) and assuming a hypothetical separation line (dashed line in red), the model only misclassified one ICU long stay patient.

FIG. 2 (F) The AUC value from ROC curve analysis was 0.92.

FIG. 2 (G) Although the APACHE score is significantly higher at day 1 in patients that remain at ICU for longer than 14 days (p=0.01, Table 1), in terms of discriminatory power it is inferior to the model disclosed herein (AUC=0, 71, n=39).

FIG. 2 (H) Testing the model on published metabolomics data (28 healthy subjects, 25 non-COV1D-19 patients, 25 non-severe COV1D-19 patients, and 28 severe COV1D-19 patients) revealed that the predicted scores from COV1D19 patients are lower than controls, and similar to the lower predicted scores by ICU long stay patients when compared to short stay (1(p value <0.001). Data points were slightly scattered across the x-axis for ease of visualization in all boxplots.

FIG. 3 (A) Predictive model of duration of invasive mechanical ventilation (WV) based on 280 measurements from day 1. OPLS score plot showing the class-discriminatory component (x-axis) versus orthogonal component (y-axis) for duration of NV, the discriminatory component explaining up to 86% of the variation in the Y phenotype variable.

FIG. 3 (B) Volcano plot showing top associated metabolites (log fold change >0.06, adjusted p value <W0.05) with duration of IMV from the linear model based on the training set.

FIG. 3 (C) The predictive model was trained on metabolites and clinical traits measured from the training set (n.17) on day one.

FIG. 3 (D) Following training, the predictive model was validated on the prediction set (n.16).

FIG. 3 (E) Shows the model comprising three metabolites and one clinical trait.

FIG. 3 (F) The model comprising the three metabolites and one clinical trait that together showed a better predictive power compared to APACHE II score.

FIG. 3 (G) Illustrates use of the model to predict the highly correlated number of days at ICU produced a correlation level of 0.66 with their observed counterparts.

FIG. 4 (A) Predictive model of duration of invasive mechanical ventilation (WV) based on measurements from day 7. OPLS score plot showing the class-discriminatory component (x-axis) versus orthogonal component (y-axis) for duration of IMV, the discriminatory component explaining up to 94% of the variation in the Y phenotype variable.

FIG. 4 (B) Volcano plot showing top associated metabolites (log fold change >0.06, adjusted p value ≤0.05) with duration of IMV from the linear model based on the training set.

FIG. 4 (C) Analysis of the training set (n=17) revealed that the best predictive model only featured metabolites and none of the clinical traits.

FIG. 4 (D) The model was validated on the prediction set (n=16).

FIG. 4 (E) The model comprised five predictive metabolites that either increased or decreased at day 7 with longer intubation days. When tested on published metabolomics data from non-ICU patients, the model revealed the extent of severity (*p value <0.05, **p value <0.001).

FIG. 4 (F) Data points were slightly scattered across the x-axis for ease of visualization in the boxplot.

FIG. 4 (G) Using the model to predict the highly correlated number of days at ICU produced a correlation level of 0.84 with their observed counterparts, superior to that based on day 1.

FIG. 5 (A) A predictive model of length of ICU stay (LOS) based on measurement from day seven. The predictive model trained on the training set (n=17).

FIG. 5 (B) The model featured the same two explanatory metabolites as its counterpart from day one in FIG. 2.

FIG. 5 (C) The model was validated using a prediction set (n=16).

FIG. 5 (D) The AUC value from ROC curve analysis was 0.81. Data points were slightly scattered across the x-axis for ease of visualization in all boxplots.

Figure 6A:
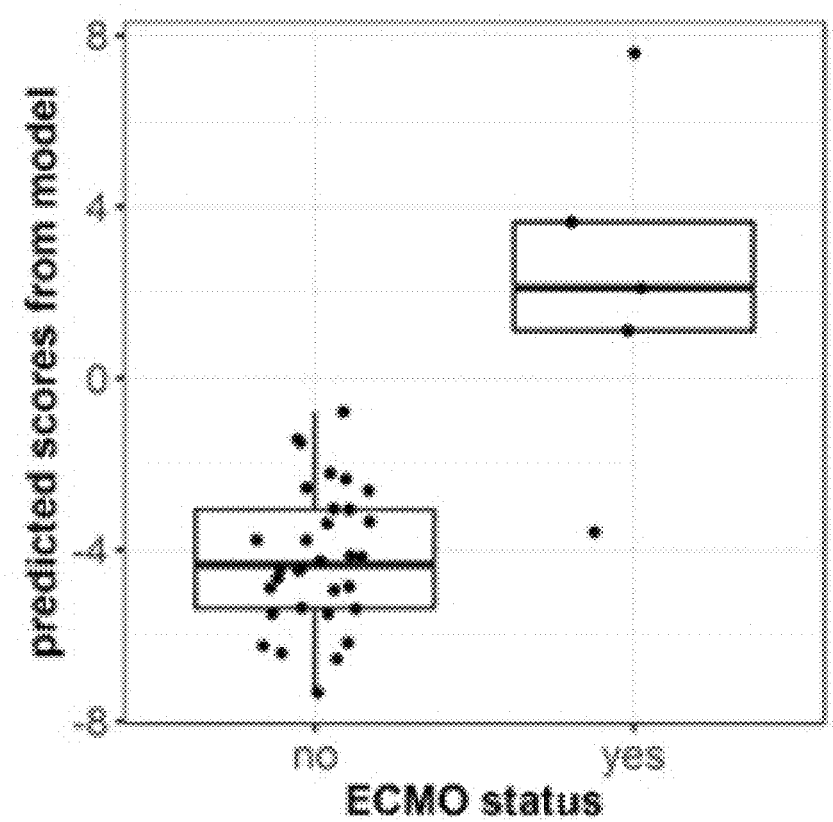
Figure 6B:
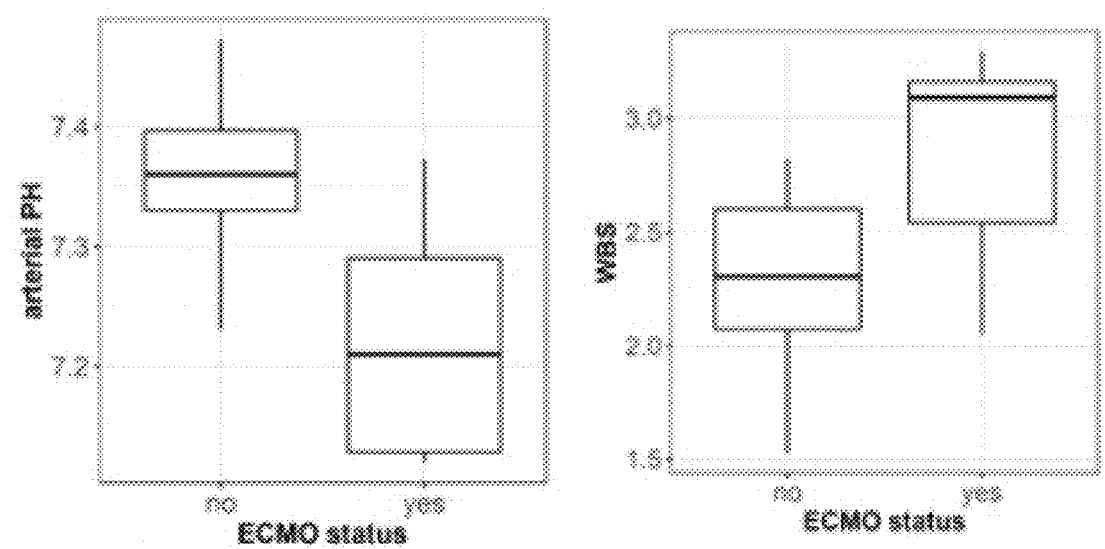

FIG. 6 (A) A predictive model of ECMO status. The model identified on the whole cohort omitting samples with missing explanatory variable values.

FIG. 6 (B) The model featured two explanatory traits: arterial pH and count of white blood cells (WBC). Only five patients required ECMO in our cohort. Due to this small number, the model was trained on the entire dataset, and no prediction set was available for validation. WBC was log-transformed for normality. Data points were slightly scattered across the x-axis for ease of visualization in (A).

DETAILED DESCRIPTION

One of the most challenging aspects of COVID-19 pandemic is managing critically-ill patients at ICU, especially at times of disease peak due to limited capacity for those who require long care. Therefore, the identification of patients who are more likely to recover and their expected duration of recovery, will provide for better management of resources at ICU.

Accordingly, disclosed herein are methods for predicting recovery patterns using early detection of metabolic changes that differentiate critically ill-COVID-19 patients under invasive mechanical ventilation (IMV) at the intensive care unit (ICU) who are likely to exhibit faster recovery. These patients represent the real burden on the health system and are liable to experience some of the worst possible outcomes of the disease. Accordingly, early prediction of their evolution at ICU is of tremendous clinical value.

Definitions

Unless otherwise defined, all terms of art, notations and other scientific terminology used herein are intended to have the meanings commonly understood by those of skill in the art to which this disclosure pertains. In some cases, terms with commonly understood meanings are defined herein for clarity and/or for ready reference, and the inclusion of such definitions herein should not necessarily be construed to represent a difference over what is generally understood in the art. The techniques and procedures described or referenced herein are generally well understood and commonly employed using conventional methodologies by those skilled in the art, such as, for example, the widely utilized molecular cloning methodologies described in Sambrook et al, Molecular Cloning-A Laboratory Manual, Cold Spring Harbor Press 4th Edition (Cold Spring Harbor, N.Y. 2012). As appropriate, procedures involving the use of commercially available kits and reagents are generally carried out in accordance with manufacturer-defined protocols and conditions unless otherwise noted.

Basic texts disclosing the general terms in molecular biology and genetics include e.g., Lackie, Dictionary of Cell and Molecular Biology, Elsevier (5th ed. 2013). Basic texts disclosing methods in recombinant genetics and molecular biology include e.g., Sambrook 2012, supra, and Current Protocols in Molecular Biology Volumes 1-3, John Wiley & Sons, Inc. (1994-1998) and Supplements 1-115 (1987-2016). Basic texts disclosing the general methods and terms in biochemistry include e.g., *Lehninger Principles of Biochemistry* sixth edition, David L. Nelson and Michael M. Cox eds. W.H. Freeman (2012).

This disclosure also utilizes routine methods in the fields of statistics. Basic texts disclosing the general methods and terms statistics and machine learning include e.g., Fawcett, Tom (2006) Pattern Recognition Letters. 27 (8): 861-874; Encyclopedia of Machine Learning and Data Mining, Claude Sammut, and Geoffrey I. Webb, eds. Springer (2017); The Elements of Statistical Learning: Data Mining, Inference, and Prediction, Trevor Hastie, Robert Tibshirani, and Jerome Friedman, eds. 2nd Edition Springer (2017). *PCA as a practical indicator of OPLS-DA model reliability* Worley, B. and Powers, R., (2016) Curr. Metabolomics 4(2):97-103; *Evaluation of predictive ability of APACHE II system and hospital outcome in Canadian intensive care unit patients* Crit Care Med. 1995 July; 23(7):1177-83. Knaus W A, et al. (1985) *APACHE II: a severity of disease classification system*. 'Critical Care Medicine. 13 (10): 818-29; Moon B H, et al. (2015) *Use of APACHE II and SAPS II to predict mortality for hemorrhagic and ischemic stroke patients*. J Clin Neurosci. 22:111-5.

This disclosure also utilizes routine methods in the field of bioinformatics. Basic texts disclosing the general methods and terms in bioinformatics include e.g., Current Protocols in Bioinformatics, Andreas D. Baxevanis and Daniel B. Davison eds. Wiley (2003).

As used herein, the singular forms "a," "an," and "the" include the plural referents unless the context clearly indicates otherwise.

The term "about" indicates and encompasses an indicated value and a range above and below that value. In certain embodiments, the term "about" indicates the designated value ±10%, ±5%, or ±1%. In certain embodiments, where indicated, the term "about" indicates the designated value ±one standard deviation of that value.

The term "combinations thereof" includes every possible combination of elements to which the term refers.

The term "subject" or 'patient" as used herein, refers to an individual or mammal having a disease or at elevated risk of having a disease (e.g., having, or at elevated risk of having a long stay in the ICU). The subject may be any mammal, including both a human and another mammal, e.g. an animal such as a rabbit, mouse, rat, or monkey. Human subjects are preferred.

The term "reference level," "reference sample," "control level," "control sample," or grammatically equivalent expressions are used interchangeably herein, to refer to a reference sample to which a test sample from a subject is compared.

The term "differentially expressed" or "differential expression" as used herein, refers to metabolites, which differ in relative abundance between a test sample and a reference sample or control, for example which differ in abundance between a reference and a short stay patient; or a reference and a long stay patient; or a short stay patient and a long stay patient. Metabolites are differentially expressed when their expression levels are either higher or lower than expression in a reference sample or control.

The term "short stay" as used herein refers to a length stay (LOS) in the intensive care unit (ICU) of 14 days or less.

The term "long stay" as used herein, refers to a length stay (LOS) in the ICU of greater than fourteen days. Patients experiencing "long stay" may, in some embodiments progress to extracorporeal membrane oxygenation (ECMO).

The term "metabolites" as used herein, refers to biologically derived molecules that are the intermediates or end products of metabolism. Thus, "metabolites" are small molecule products of biological processes. "Metabolites" such as e.g., hypoxanthine and betaine, are readily measured using techniques such as e.g., mass spectrometry, nuclear magnetic resonance (NMR), etc.

The term "clinical trait" as used herein, refers to demographics, anthropometrics, medical history data including age, ethnicity, vital signs, body mass index (BMI), comorbidities, complete blood count (CBC), conventional coagulation tests including D-Dimer test and kidney and liver function. Thus, a clinical trait is a conventional test given to ICU patients.

The term "specificity" as used herein has the meaning commonly understood in the art (see e.g., Fawcett, Tom (2006) Pattern Recognition Letters. 27 (8): 861-874). "Specificity" is a statistical measure of how well a binary classification test correctly identifies a condition, for example, how frequently it correctly classifies a subject having a long ICU stay or at elevated risk of having a long ICU stay and/or progressing to ECMO. "Specificity" measures the proportion of negatives that are correctly identified (e.g. the proportion of those who do not have a long stay in the ICU (short stay) who are correctly identified as not having long stay in the ICU (short stay). Thus, Specificity=True Negative/(False Positive+True Negative)× 100% or 1−false positive rate.

A discussion of "sensitivity" and "specificity" as known in the art can be found, for example, on the Internet at en.wikipedia.org/wiki/Sensitivity and specificity.

The term "predictive value" or "positive predictive value" as used herein refers to the ratio of true positives out of all identified positives.

The term "Receiver operating characteristic (ROC) curves" refers to a graphical measure of sensitivity (y-axis) vs. 1-specificity (x-axis) for a clinical test, which is known in the art (see e.g., Fawcett, (2006) supra). A measure of the accuracy of a clinical test is the area under the ROC curve value (AUC value). If this area is equal to 1.0 then this test is 100% accurate because both the sensitivity and specificity are 1.0 so there are no false positives and no false negatives. On the other hand a test that cannot discriminate is the diagonal line from 0, 0 to 1,1. The ROC area for this line is 0.5. ROC curve areas (AUC-values) are typically between 0.5 and 1.0. Thus, an AUC-value close to 1 (e.g. 0.95) represents a clinical test as that has high sensitivity and specificity and accuracy.

The term "APACHE II score" refers to a morbidity score for a patient. Typically, the APACHEII score may be used to decide what kind of treatment or medicine is given. Methods exist to derive a predicted mortality from this score, as well. APACHE II is well known in the art see e.g., Knaus W A, et al. (1985) supra; Moon B H, et al. (2015) supra.

The term "biomarker" as used herein, refers to a characteristic that can be objectively measured and evaluated as an indicator of normal and disease processes or pharmacological responses. A "biomarker" is a parameter that can be used to measure the onset or the progress of disease or the effects of treatment. The parameter can be chemical, physical or biological.

As used herein, "treating" or "treatment" of any disease or disorder refers, in certain embodiments, to ameliorating a disease or disorder that exists in a subject. "Treating" or "treatment" includes ameliorating at least one physical parameter, which may be indiscernible by the subject. In yet another embodiment, "treating" or "treatment" includes modulating the disease or disorder, either physically (e.g., stabilization of a discernible symptom) or physiologically (e.g., stabilization of a physical parameter) or both. In yet another embodiment, "treating" or "treatment" includes delaying or preventing the onset of the disease or disorder. Further, as used herein, "treatment" includes preventing or delaying the recurrence of the disease, delaying or slowing the progression of the disease, ameliorating the disease state, providing a remission (partial or total) of the disease, decreasing the dose of one or more other medications required to treat the disease, delaying the progression of the disease, increasing or improving the quality of life, increasing weight gain, and/or prolonging survival. Also encompassed by "treatment" is a reduction of pathological consequence of a disease e.g., severe COVID-19.

As used herein, the term "therapeutically effective amount" or "effective amount" refers to an amount of the subject compositions that when administered to a subject is effective to treat a disease or disorder. For example, in an exemplary embodiment, the phrase "effective amount" is used interchangeably with "therapeutically effective amount" or "therapeutically effective dose" and the like, and means an amount of a therapeutic agent that is effective for treating severe COVID-19 or severe respiratory illness that could require ICU stay or invasive mechanical ventilation. Effective amounts of the compositions may vary according to factors such as the disease state, age, sex, weight of the animal or human.

Introduction

Metabolomics is a new approach in system biology which is used to characterize small biochemical entities which change in response to various stimuli and serve as effector molecules in biological processes. Accordingly, identification of metabolic biomarkers related to the severity of adverse outcomes and/or favorable response to therapy is important for prediction and management of patient outcomes. Therefore, in embodiments, the disclosure provides methods of evaluating, e.g., predicting, amongst other things, a patient's risk of a long stay in the ICU and/or the duration a patient must suffer invasive mechanical ventilation (IMV).

The disclosure provides predictive models based on the metabolites hypoxanthine and betaine measured at two time points (the day of intubation and seven days later), were identified to predict long (more than 14 days) from short stay at ICU. The AUC was 0.92 for the first time point (day one) and 0.81 for the second time point (day seven), which suggests better performance by the former.

The disclosure also provides two additional models predictive of the number of days under mechanical ventilation based on metabolites and clinical traits measured at the day of intubation and seven days later. Based on time one, three metabolites and one clinical trait were identified as best predictors of longer intubation days. These included on-admission elevated creatinine and D-dimer as oppose to reduced 3-methylhistidine and lysoPC.a.C20.4. A better predictive model of intubation days was obtained using five metabolites measured at day 7, although effectively only predictive of intubation days longer than a week, including elevated kynurenine and p.Cresol.SO4 as oppose to lower levels of 3-methylhistidine, ornithine and SM.C24.1 at day 7 post admission predictive of longer duration of mechanical ventilation to come.

Viral pathogenesis involves modulation of host metabolism, offering biomarkers with diagnostic and therapeutic potential. Early detection of metabolic changes differentiating critically ill-COVID-19 patients under mechanical ventilation at the intensive care unit (ICU) who are likely to exhibit faster recovery would help in disease management.

Metabolomics analysis of serum samples from 39 COVID-19 patients under mechanical ventilation in the ICU at the time of intubation and a week later was performed using targeted quantitative-metabolomics. A generalized linear model (GLM) was used to identify, at both time points, metabolites and clinical traits that predict the pattern of stay at ICU (short/long) as well as the duration of mechanical ventilation. All models were initially trained on a set of randomly selected individuals and validated on the remaining individuals in the cohort.

A model based on two metabolites measured at the time of intubation was best at predicting whether a patient is likely to endure a short or long stay at ICU (AUC=0.92). A further model based five metabolites, measured one-week post intubation, accurately predicted the duration of mechanical ventilation. The Pearson correlation between observed and predicted number of days under ventilation was 0.94. Both predictive models outperformed APACHEII score and differentiated COVID-19 severity in published data.

Thus, the methods disclosed herein, identified specific metabolites that predict duration at ICU and days under mechanical ventilation. Accordingly, the identified metabolites serve as predictive biomarkers of clinical outcome and therapeutic targets.

The foregoing description is of a small number of embodiments for implementing the the methods disclosed herein and is not intended to be limiting in scope. One of skill in the art will immediately be able to envisage the methods and variations used to implement this disclosure in other areas than those described in detail.

Sample Collection and Data Generation

A biological sample e.g., patient serum, can be collected from patients using any method known in the art e.g., by collecting whole blood. Metabolites isolated from the biological sample are quantitated and analyzed by any convenient method known in the art, for example using Gas Chromatography Mass Spectrometry (GCMS) or other mass spectrometry methods (see e.g., Mass Spectrometry, A Textbook (2020) Jürgen H. Gross, Springer (2006); Alvarez-Sanchez B., et al. (2012). J. Chromatogr. A. 1248:178-181; Sugimoto M., (2010) Metabolomics. 2010; 6:78-95).

Example

Background Detection of early metabolic changes in critically-ill COVID-19 patients under invasive mechanical ventilation (IMV) at the intensive care unit (ICU) can predict recovery patterns and help in disease management.

Accordingly, targeted metabolomics of serum samples from 39 COVID-19 patients under invasive mechanical ventilation (IMV) in ICU was performed at two time points. The first was within 48 hours of intubation, and the second was one week later. A generalized linear model (GLM) was used to identify, at both time points, metabolites and clinical traits that predict the length of stay (LOS) at ICU well as the duration under IMV. A short stay is defined as less than or equal to 14 days (≤14 days). A long stay is defined as greater than 14 days (>14 days). All models were initially trained on a set of randomly selected individuals and validated on the remaining individuals in the cohort. Further validation in recently published Metabolomics data of COVID-19 severity was performed.

As disclosed herein below, a model based on hypoxanthirie and betaine measured at first time point was best at predicting whether a patient is likely to experience a short or long stay at ICU (AUC=0.92). A further model based on kynurenine, 3-methylhisticline, Ornithine, p-Cresol sulfate and C24.0 sphingomyelin, measured one-week later, accurately predicted the duration of IMV (Pearson correlation=0.94). Both predictive models outperformed APACHE II scores and differentiated COVID-19 severity in published data. Therefore, the present disclosure identifies specific metabolites that predict, in advance, LOS and IMV facilitate the management of COVID-19 cases at ICU.

The specific ICU-related outcomes were the duration of IMV in days and the length of stay (LOS) at ICU given as short/long for patients who spent shorter or longer than 14 days at ICU, respectively. Also, the ECMO status distinguishes patients who required assisted oxygenation via ECMO from those who did not. With respect to LOS, the 14 days cut-off was based on the median of the ICU duration across the cohort (FIG. 1). Orthogonal partial least square (OPLS) and its counterpart (OPLS-DA, DA standing for discriminant analysis) from SIMCA were used for QC to examine the separation of samples according to the continuous "duration of IMV" and categorical "LOS" phenotypes, respectively. This was based on metabolomics data measured on both time points, days 1 and 7, separately (see e.g., FIGS. 2A, 3A, 4A).

Study Design

This was a cross-sectional study containing 39 critically-ill COVID-19 patients admitted to ICU at Hamad Medical Corporation (HMC), the main health care provider in Qatar. Protocols were approved by Institutional Review Boards (IRBs) of HMC (MRC-05-007) and Qatar University (1289-EA/20). All methods were performed in accordance with the relevant guidelines and regulations. Informed consents were obtained from all subjects or legal guardian. Demographics, anthropometrics, and medical history data were collected including age, ethnicity, vital signs, body mass index (BMI), comorbidities, complete blood count (CBC), and kidney and liver function. Throughout the article, we refer to these phenotype measures as clinical traits. The ICU prognostic Acute Physiology and Chronic Health Evaluation II (APACHE II) scoring system was adopted as a predictive measure of death and a correlate of disease severity in critical patients. Patients' intubation started from 2 days before ICU admission to 4 days after ICU admission. Blood samples were collected from ICU patients within 48 h of intubation and 7 days later. Time of first sample collection is referred to as day one; similarly, the time of second sample collection is referred to as day seven. Patients were followed up to 60 days after recruitment, and information on days at ICU, days under IMV, progression to extracorporeal membrane oxygenation (ECMO), and deaths was recorded (FIG. 1).

FIG. 1 provides a schematic representation of the study design. Day one represents the day of inclusion and first sample collection when all participants were already under mechanical ventilation, Patients' intubation started two days before to four days after ICU admission (window of intubation). Blood samples were collected from ICU patients one day before ICU admission to five days after ICU admission (window of ICU admission), then seven days later. Clinical and metabolic profiles were measured at day one, and day seven, and were correlated with four phenotypes: two continuous (days at ICU and days under mechanical ventilation) and two categorical (short (≤14 days) or long (>14 days) stay at ICU and progression to ECMO. Clinical outcomes were recorded at days one, seven, fourteen, twenty-one and sixty. Participants' data for age, BMI, days under mechanical ventilation and days at ICU are presented as mean±standard deviation (SD).

Metabolomics

The targeted metabolomics approach allows for the simultaneous quantification of up to 630 metabolites from 26 compound classes (1 alkaloid, 1 amine oxide, 20 amino acids, 30 amino acid related, 14 bile acids, 9 biogenic amines, 1 carbohydrates and related, 7 carboxylic acids, 1 cresol, 12 fatty acids, 4 hormones, 4 indoles and derivatives, 2 nucleobases and related, 1 vitamin and cofactor, 40 acylcarnitines, 76 phosphatidylcholines, 14 lysophosphatidylcholines, sphingomyelins, 28 ceramides, 8 dihydroceramides, 19 hexosylceramides, 9 dihexosylceramides, 6 trihexosylceramides, 22 cholesteryl esters, 44 diglycerides, and 242 triglycerides) using a combination of liquid chromatography and mass spectrometry. Briefly, a 96-well-based sample preparation device was used to quantitatively analyze the metabolite profile in the serum samples (<50 μl). This device consists of inserts that have been spotted with internal standards, and a predefined sample amount was added to the inserts. Next, a phenylisothiocyanate solution was added to derivatize some of the analytes (e.g., amino acids), and after the derivatization was completed, the target analytes were extracted with an organic solvent, followed by a dilution step.

The obtained extracts were then analyzed by flow injection analysis-tandem mass spectrometry (FIA-MS/MS) using a SCIEX 5500 QTRAP™ mass spectrometer (SCIEX, Darmstadt, Germany) for lipids and liquid chromatography-tandem mass spectrometry (LC-MS/MS) using Agilent 1290 Infinity II liquid chromatography (Agilent, Santa Clara, CA, USA) coupled with a SCIEX 5500 QTRAP™ mass spectrometer (SCIEX, Darmstadt, Germany) for small molecules using multiple reaction monitoring (MRM) to detect the analytes. Data was quantified using SCIEX Analyst® software and imported into Biocrates MetIDQ™ software for calculating analyte concentrations, data assessment, and compilation.

After measurement of 10% of samples, quality control of data was performed to check for variability and batch effects, e.g., based on site or for hexose (indication for degradation of metabolites). The measurement range was defined upfront and instrument parameter was checked.

Data Processing

After normalization and pre-processing of the data, MetIDQ™ software (Biocrates) was used for peak integration and calculation of metabolite concentrations. If the measurements were outside the measurable range, values were imputed as follows: concentrations below the detection limit (LOD) was set to half of the lowest measured concentrations. Concentrations below the limit of quantification (LOQ) were set to half of the LOQ. In addition, concentration higher than the highest calibration standard concentration was set to the highest standard concentrations. Concentration of each metabolite was given in micromolars. Raw metabolomics data is publically available (on the world wide web at doi.org/10.6084/m9.figshare.14954907.v1).

Statistical Analysis

Clinical traits analysis was carried out using IBM SPSS version 25. Variables with skewed distributions were log-transformed to ensure normality (9). Comparisons were performed with t-test, Wilcoxon-Mann-Whitney, and one-way ANOVA as appropriate. Significance was defined as p<0.05. Non-parametric tests were used for comparing ordinal or non-normal variables. Metabolomics data analysis was performed using SIMCA 16.0.2 software (Umetrics, Umea, Sweden) and R version 4.0.2. Data were log-transformed and scaled.

Phenotype Definition

The specific ICU-related outcomes of interest to this study were the duration of IMV in days and the length of stay (LOS) at ICU given as short/long for patients who spent shorter or longer than 14 days at ICU, respectively. Also, the ECMO status distinguishes patients who required assisted oxygenation via ECMO from those who did not. It is important to note that with respect to LOS, the 14 days cut-off was based on the median of the ICU duration across the cohort (FIG. 1). Orthogonal partial least square (OPLS) and its counterpart (OPLS-DA, DA standing for discriminant analysis) from SIMCA were used for QC to examine the separation of samples according to the continuous "duration of IMV" and categorical "LOS" phenotypes, respectively. This was based on metabolomics data measured on both time points, days 1 and 7, separately (see FIG. 2A, FIG. 3A, FIG. 4A).

Variable Selection

The primary goal of this study was to build statistical models that can predict our ICU phenotypes of interest. To this end, the cohort was randomly split into a training and a validation set. The fact that the number of metabolites and clinical traits far exceeded the number of individuals in our cohort complicates the statistics of fitting a predictive model. Therefore, subsets of markers significantly associated with the phenotypes of interest needed to be determined a priori. These would serve as seed variables on which to train the predictive models for the target phenotypes. The identification of such subset was performed on the training set in two steps: First, each trait was associated with the phenotype of interest in a general linear model. With metabolites, the model also incorporated principal components (PC) PC1 and 2, from principal component analysis (PCA), BMI, and age as confounders:

$$Y_{metabolite} \sim age+BMI+PC1+PC2+phenotype$$
$$Y_{trait} \sim phenotype$$

Second, we used the elastic net-regularized extension of the generalized linear model, implemented in the R package GLMNET, to regress the phenotypes of interest on the measured metabolites as follows:

$$Y_{phenotype} \sim metabolite_1+metabolite_2+ \ldots +metabolite_n$$

Since the GLMNET accepts no missing values, we therefore removed samples where the significant metabolites from the linear model (step 1) were not measured, then omitted metabolites with missing values in the remaining samples. The advantage of the GLMNET analysis is its ability to deal with a large number of explanatory variables at once whereby the association of each metabolite with the phenotype is assessed while accounting for the effect of the remaining metabolites. However, the GLMNET framework is mostly mathematical and offers little statistical properties in terms of model fit, which justifies the following additional analysis step.

Predictive Model Formulation

We used the generalized linear model based on the binomial distribution for the categorical phenotypes (ECMO and ICU stay) as oppose to the Poisson distribution for modeling the number of days under IMV. Each model was fit on the training set and featured all metabolites promoted by the GLMNET as well as traits found significant from the initial linear model. The model was then refined in a stepwise procedure, omitting a variable each time and reassessing the fit until the best explanatory subset of variables was found. The evaluation of the model was based on the Pearson correlation between observed and predicted days under IMV for the remaining samples in the cohort or the prediction set. As for the categorical phenotypes, receiver operating characteristic (ROC) curve analysis, sensitivity, and specificity measures at median predicted value were used. Owing to explanatory variable missing values, the predictive models for duration under IMV and LOS were based on a subset of the cohort with n=33 (17 training/16 prediction) out of a total of 39. It is important to note that for all phenotypes, a model was constructed at each time point separately Model Additional Validation on Published Data We used published metabolomics data (Shen B, et al. (2020) *Proteomic and Metabolomic Characterization of COVID-19 Patient Sera*. Cell. (2020) 182:59-72.e15a) measured from a cohort of n=106 individuals comprising of 28 healthy subjects, 25 non-COVID-19 patients (negative for the SARS-CoV-2 nucleic acid test) with similar clinical characteristics as COVID-19 patients, 25 non-severe COVID-19 patients, and 28 severe COVID-19 patients. The published data in question was further processed by log transformation and z-scaling.

Results

General Characteristics of Participants

Thirty-nine mid-age (48±11.1 years) critically-ill patients were recruited among patients admitted to the ICU at HMC. Among recruited patients, 15 (38.5%) patients had type 2 diabetes, 15 (38.5%) patients had hypertension, and three (7.7%) had coronary artery disease (CAD). All patients were under IMV on day one of sample collection. Patients spent on average 16.8 days (SD=13.3) at ICU with a median of 14, of which 9.2 days (SD=7.3) were under IMV. At week two (day 7), 26 patients (66.7%) were extubated. At week three (day 14), 30 patients (76.9%) were extubated, 20 (51.3%) left the ICU, and one (2.6%) died (FIG. 1). Differences in clinical features of study participants based on their test results on day one and day seven are summarized in Table 1(A). Certain clinical features significantly increased during the 1st week at ICU, including arterial pH (pH art), serum lactate, triglycerides, alanine aminotransferase (ALT), albumin, bicarbonate, phosphorus, mean corpuscular volume (MCV), white blood cells (WBC), percentage of monocytes, and C-reactive protein (CRP), whereas both fibrinogen and partial thromboplastin time (PTT) were significantly reduced during the 1st week at ICU. Differences in clinical features between patients who remained in the ICU (long stay) and those discharged prior to day 14 (short stay) based on measurement on day one are shown in Table 1(B). Among the clinical features measured on day one, only APACHE II score was significantly lower in patients who subsequently left ICU before day 14. Among the clinical traits measured at day 7, the data suggested that patients who left ICU earlier than day 14 had significantly higher red blood cell count (RBC), hemoglobin, percentage hematocrit, and the number of lymphocytes and monocytes, but lower triglycerides, urea, absolute neutrophil count (ANC), and percentage of neutrophils and eosinophils (Table 1(C)).

TABLE 1

Clinical traits of critically-ill COVID-19 patients

| Clinical Traits | A: Overall differences in day 1 and 7 | | | B: Based on day 1 measurements | | | C: Based on day 7 measurements | | |
|---|---|---|---|---|---|---|---|---|---|
| | Day 1 (n = 39) | Day 7 (n = 39) | p value | Long Stay (>14 days) (n = 19) | Short Stay (<14 days) (n = 20) | p value | Long Stay (>14 days) (n = 19) | Short Stay (<14 days) (n = 20) | p value |
| Age (years) | | 48 (11.1) | | 50 (11.1) | 45.6 (11.1) | 0.23 | | | |
| BMI (Kg/m2) | | 28.3 (4.3) | | 29.3 (5.3) | 26.9 (2.3) | 0.22 | | | |
| SpO2 % | 96.8 (1.9) | 96.4 (1.9) | 0.554 | 98 (2) | 96.3 (2) | 0.2 | 96.2 (2) | 96.7 (1.9) | 0.51 |
| art pH | 7.4 (0.1) | 7.5 (0.1) | <0.001 | 7.4 (0.1) | 7.3 (0.1) | 0.57 | 7.4 (0.1) | 7.5 (0.1) | 0.08 |
| PaO2 (mmHg) | 77.9 (19.4) | 88.5 (45.7) | 0.446 | 71 (22) | 80.2 (22) | 0.5 | 94.3 (20.8) | 79.3 (22.1) | 0.45 |
| PaCO2 (mmHg) | 43 (5.5) | 40 (8.1) | 0.247 | 41.7 (5.3) | 43.4 (5.3) | 0.65 | 41.6 (8) | 36.7 (8.2) | 0.15 |
| Lactate (mmol/L) | 1.1 (0.3) | 1.6 (0.6) | 0.023 | 0.9 (0.3) | 1.2 (0.3) | 0.16 | 1.7 (0.4) | 1.3 (0.4) | 0.12 |
| Creatine (umol/L) | 108.5 (60.5) | 115.4 (95) | 0.811 | 161 (26.2) | 92.8 (26.2) | 0.09 | 144.8 (39.7) | 84.1 (28.5) | 0.06 |
| T. Bilirubin (umol/L) | 11 (3.6) | 31.4 (56.7) | 0.223 | 14.3 (2.5) | 9.9 (2.5) | 0.06 | 49.3 (8.3) | 16.5 (8.5) | 0.1 |
| T. protein (gm/L) | 66.1 (5.3) | 63.5 (9.5) | 0.386 | 63.5 (5.8) | 66.7 (5.8) | 0.48 | 63.3 (7.1) | 63.3 (7.3) | 1 |
| Triglycerides (mmol/L) | 1.7 (0.5) | 3.7 (1.7) | 0.002 | 1.5 (0.5) | 1.8 (0.5) | 0.6 | 4.2 (0.6) | 2.9 (0.6) | 0.05 |
| ALT (U/L) | 45.7 (34.5) | 119.9 (83.3) | 0.005 | 30.3 (38.6) | 50.8 (38.6) | 0.4 | 126.6 (66.4) | 113.6 (66.4) | 0.66 |
| AST (U/L) | 47.5 (28.5) | 69 (62.6) | 0.261 | 44 (33.1) | 48.7 (33.1) | 0.82 | 68.5 (78.6) | 69.5 (78.6) | 0.96 |
| ALP (U/L) | 66.4 (20.9) | 97.8 (76.3) | 0.153 | 61 (23.2) | 68 (23.2) | 0.63 | 118.7 (41.9) | 76.9 (40.5) | 0.13 |
| Albumin (gm/L) | 25.5 (3.1) | 28.6 (4.8) | 0.035 | 26.3 (3.4) | 25.3 (3.4) | 0.63 | 27.9 (4.5) | 29.2 (4.6) | 0.44 |
| Glutamine (mmol/L) | 11.3 (4.6) | 10.4 (4.4) | 0.621 | 9.3 (5.3) | 12.1 (5.3) | 0.42 | 11.8 (3.8) | 9.3 (3.8) | 0.11 |
| Cholesterol (mmol/L) | 102.1 (4.2) | 104.6 (6.8) | 0.203 | 102.7 (4.3) | 101.9 (4.3) | 0.79 | 104.5 (6) | 104.5 (6.1) | 0.99 |
| Bicarbonate (mmol/L) | 21.9 (2.9) | 25.5 (4.4) | 0.012 | 22 (2.5) | 21.9 (2.5) | 0.96 | 26.5 (3.6) | 24.5 (3.7) | 0.18 |
| Sodium (mmol/L) | 138.2 (4.7) | 142.3 (7.2) | 0.064 | 137.3 (3.3) | 138.5 (3.3) | 0.72 | 144 (7.1) | 140.4 (7) | 0.13 |
| Potassium (mmol/L) | 4.3 (0.7) | 4.3 (0.5) | 0.922 | 4.1 (0.7) | 4.4 (0.7) | 0.58 | 4.5 (0.4) | 4.2 (0.5) | 0.11 |
| Magnesium mmol/L) | 1.1 (0.2) | 1 (0.1) | 0.281 | 0.9 (0.2) | 1.2 (0.2) | 0.22 | 1.1 (0.1) | 1 (0.1) | 0.1 |
| Phosphate (mmol/L) | 1 (0.2) | 1.3 (0.3) | 0.022 | 0.9 (0.2) | 1 (0.2) | 0.72 | 1.3 (0.2) | 1.2 (0.2) | 0.59 |
| Urea (mmol/L) | 7 (3.4) | 15 (9.6) | 0.075 | 10 (3.9) | 7.8 (3.8) | 0.13 | 18.7 (4.8) | 11.2 (4.5) | 0.02 |
| Calcium (mmol/L) | 1.9 (0.5) | 2.7 (3.6) | 0.487 | 1.7 (0.5) | 2 (0.5) | 0.5 | 3.4 (0.3) | 2.1 (0.3) | 0.33 |
| Fibrinogen (gm/L) | 6.5 (1.9) | 2.9 (1.1) | <0.001 | 5.5 (2.1) | 6.9 (2.1) | 0.41 | 2.7 (1.3) | 3.2 (1.3) | 0.27 |
| D-dimer (mg/L) | 4.8 (7.4) | 5.4 (5.5) | 0.8 | 11 (4.6) | 3 (4.6) | 0.19 | 6.5 (4.6) | 4 (4.8) | 0.26 |
| Ferritin (μg/L) | 1346.1 (1039.8) | 1255.9 (823.7) | 0.766 | 680 (1120.5) | 1568.1 (1120.5) | 0.21 | 1227.1 (624.9) | 1286.7 (624.9) | 0.84 |
| RBC (x10^6/μL) | 4.7 (1) | 4.4 (1.1) | 0.291 | 4.1 (1) | 4.9 (1) | 0.35 | 3.8 (1) | 5 (1) | <0.001 |
| Hemoglobin (gm/dL) | 12.4 (1.7) | 12 (2.6) | 0.679 | 11.9 (1.7) | 12.5 (1.7) | 0.62 | 10.6 (2.3) | 13.5 (2.2) | <0.001 |
| Hematocrit % | 36.7 (5.4) | 37.2 (8.1) | 0.868 | 35.4 (5.1) | 37.3 (5.1) | 0.63 | 33.4 (7) | 41.4 (6.7) | <0.001 |
| MCHC (gm/dL) | 32.6 (1.7) | 32.3 (1.4) | 0.604 | 32.7 (64.3) | 46.7 (65.8) | 0.42 | 32.1 (1.3) | 32.5 (1.3) | 0.34 |
| MCH (pg) | 26.4 (3.6) | 28.1 (2.5) | 0.106 | 28.4 (2.6) | 26.8 (2.6) | 0.12 | 28.6 (1.8) | 27.5 (1.7) | 0.16 |
| MCV (fL) | 80.6 (8.7) | 86.9 (7.7) | 0.032 | 79.3 (9.8) | 81 (9.8) | 0.82 | 89.1 (4.6) | 84.5 (4.2) | 0.08 |
| MPV(fL) | 10.6 (0.9) | 11 (1.2) | 0.421 | 10.2 (1) | 10.8 (1) | 0.48 | 11.4 (1.1) | 10.7 (1.1) | 0.07 |
| PDW (fL) | 13.3 (2.8) | 13.8 (2.9) | 0.648 | 11.8 (3) | 13.7 (3) | 0.42 | 14.8 (2.5) | 13.2 (2.6) | 0.14 |
| RDW-CV % | 14.5 (1.7) | 14 (1.7) | 0.421 | 14.4 (1.7) | 14.5 (1.7) | 0.92 | 14.3 (1.7) | 13.5 (1.4) | 0.14 |
| WBC (x10^3/μL) | 10.3 (3.5) | 15.9 (6.2) | 0.005 | 11.1 (2.9) | 10 (2.9) | 0.64 | 17.2 (4.6) | 14.7 (4.7) | 0.25 |
| ANC (x10^3/μL) | 9.5 (3.4) | 13.5 (6.6) | 0.101 | 10.7 (3.3) | 9 (3.3) | 0.58 | 15.8 (5.1) | 11.3 (5.2) | 0.05 |
| Neutrophils (%) | 87.6 (4.6) | 83.7 (11.4) | 0.325 | 86 (3.9) | 88.4 (3.9) | 0.5 | 88.9 (13.2) | 77.9 (13.1) | <0.001 |
| Basophils (x10^3/μL) | 0 (0) | 0.1 (0.1) | 0.495 | 0 (0) | 0 (0) | 0.52 | 0.1 (0) | 0 (0) | 0.22 |
| Basophils (%) | 0.3 (0.2) | 0.3 (0.2) | 0.916 | 0.2 (0.2) | 0.3 (0.2) | 0.3 | 0.3 (0.2) | 0.3 (0.2) | 0.65 |
| Eosinophils (x10^3/μL) | 0 (0) | 0.1 (0.2) | 0.064 | 0.01 (0.11) | 0.03 (0.12) | 0.6 | 0.1 (0.2) | 0.2 (0.2) | 0.03 |

TABLE 1-continued

Clinical traits of critically-ill COVID-19 patients

| Clinical Traits | A: Overall differences in day 1 and 7 | | | B: Based on day 1 measurements | | | C: Based on day 7 measurements | | |
|---|---|---|---|---|---|---|---|---|---|
| | Day 1 (n = 39) | Day 7 (n = 39) | p value | Long Stay (>14 days) (n = 19) | Short Stay (<14 days) (n = 20) | p value | Long Stay (>14 days) (n = 19) | Short Stay (<14 days) (n = 20) | p value |
| Eosinophils (%) | 0.1 (0.1) | 0.9 (1.2) | 0.06 | 0 (0.2) | 0.1 (0.2) | 0.6 | 0.3 (1.4) | 1.3 (1.4) | 0.02 |
| Lymphocytes (×10^3/μL) | 0.9 (0.3) | 1.7 (3.2) | 0.421 | 0.9 (0.3) | 0.9 (0.3) | 0.91 | 1.9 (1) | 1.7 (1) | 0.83 |
| Lymphocytes (%) | 8.4 (3.3) | 9.1 (7.7) | 0.791 | 8.8 (2.1) | 8.2 (2.1) | 0.87 | 4.9 (8.6) | 13.4 (8.5) | <0.001 |
| Monocytes (×10^3/μL) | 0.4 (0.2) | 0.8 (0.4) | 0.022 | 0.5 (0.2) | 0.4 (0.2) | 0.59 | 0.7 (0.4) | 0.9 (0.4) | 0.14 |
| Monocytes (%) | 4 (1.9) | 5.7 (3.3) | 0.173 | 4.2 (2.1) | 3.9 (2.1) | 0.88 | 4.3 (3.9) | 7.2 (3.8) | 0.01 |
| Platelets (×10^3/μL) | 312.6 (102.1) | 343.5 (169) | 0.572 | 297.5 (108.7) | 316 (108.7) | 0.83 | 297.2 (175.4) | 385 (175.1) | 0.16 |
| APTT (sec) | 36.4 (18.3) | 28.4 (9.9) | 0.099 | 31.8 (20.9) | 37.7 (20.9) | 0.71 | 30.1 (4.3) | 26.7 (4.3) | 0.36 |
| PTT (sec) | 18.5 (11.1) | 12.8 (1.5) | 0.008 | 13 (12.3) | 20.4 (12.3) | 0.45 | 12.8 (0.9) | 12.8 (0.9) | 0.92 |
| CRP (mg/L) | 281.7 (164.1) | 29.4 (45.4) | <0.001 | 159 (107.5) | 208.5 (106.9) | 0.16 | 22.7 (72.7) | 39.5 (72.7) | 0.5 |
| APACHE II Score | 15.1 (6.4) | N/A | N/A | 17.8 (4.4) | 12.7 (4.4) | 0.01 | | | |

Figure 2A:
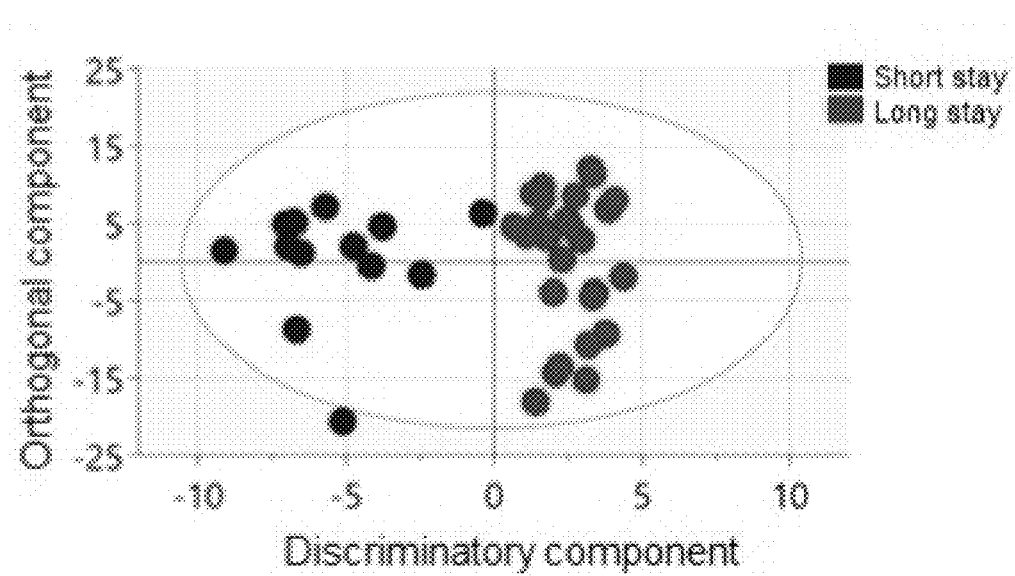
Figure 2B:
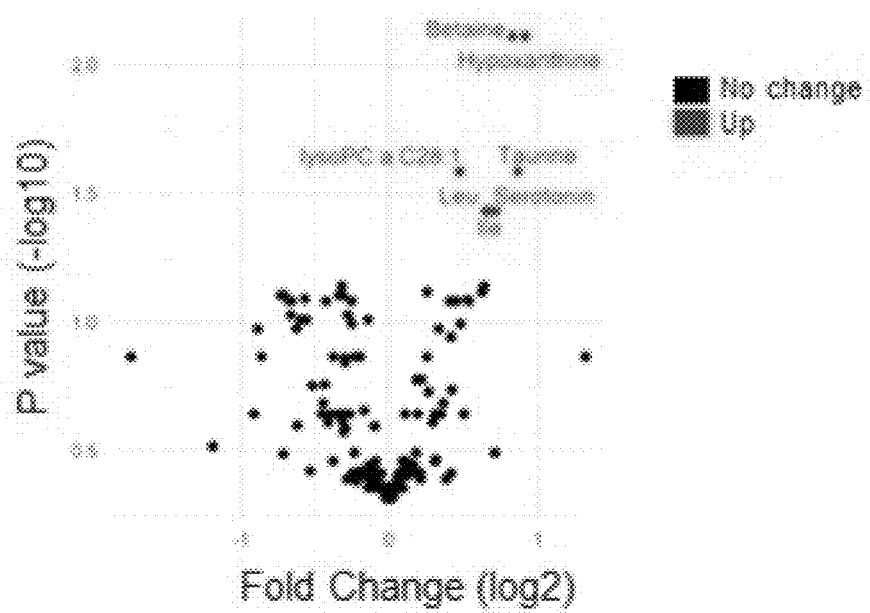
Figure 2C:
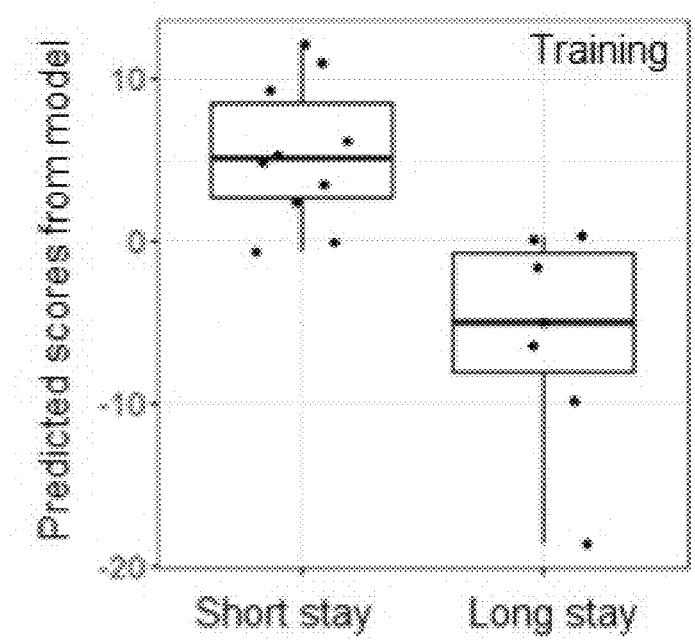
Figure 2D:
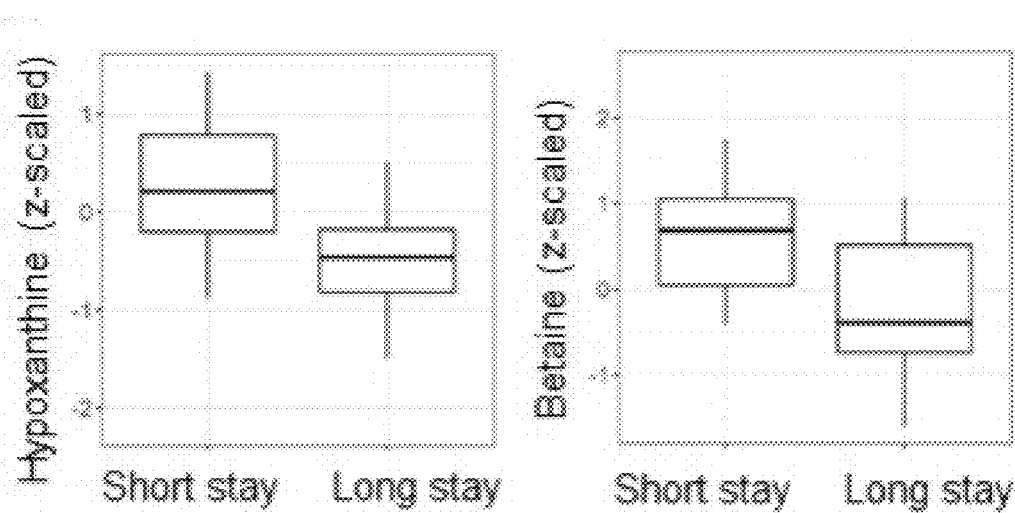
Figure 2E:
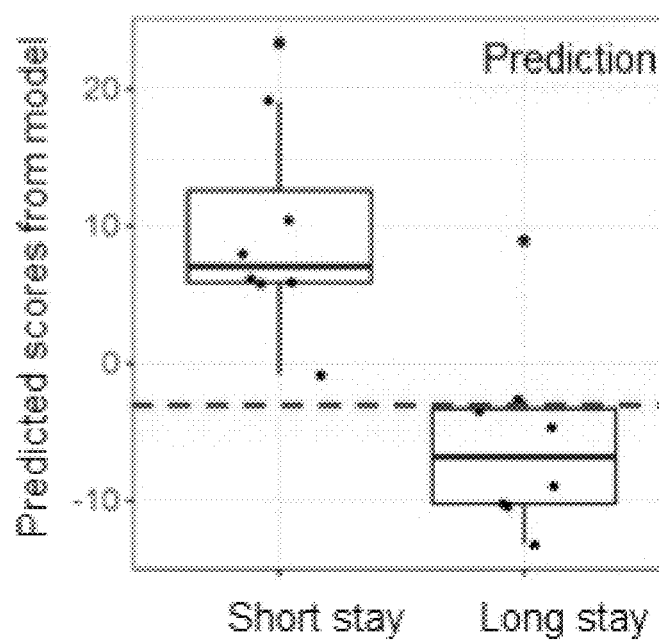
Figure 2F:
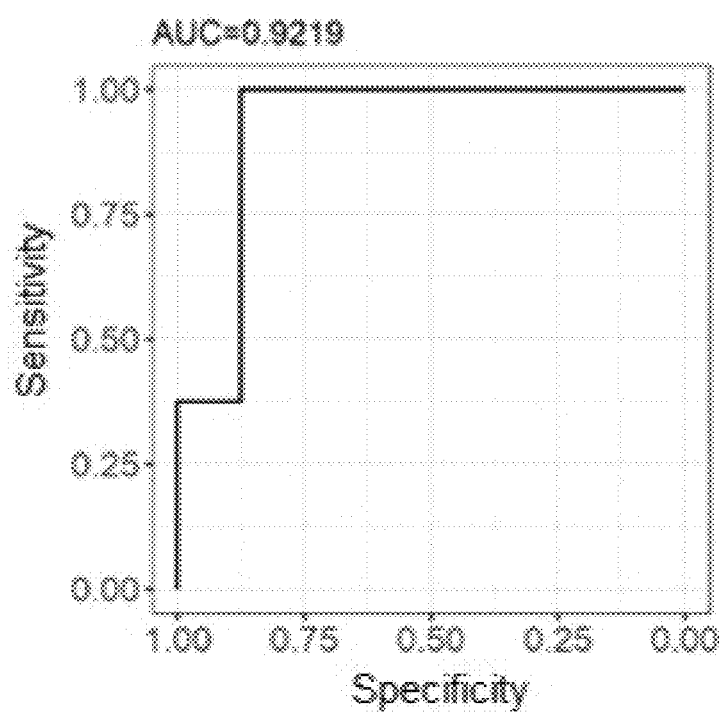
Figure 2G:
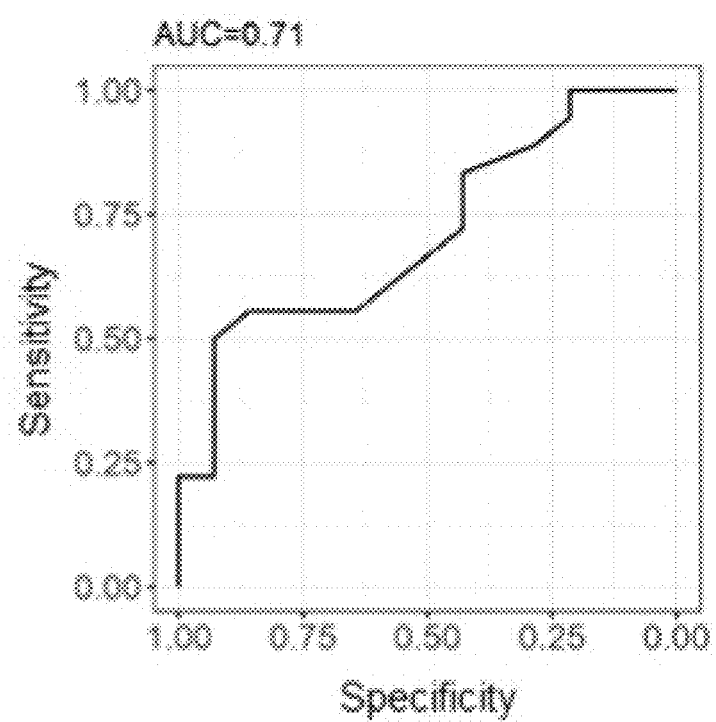
Figure 2H:
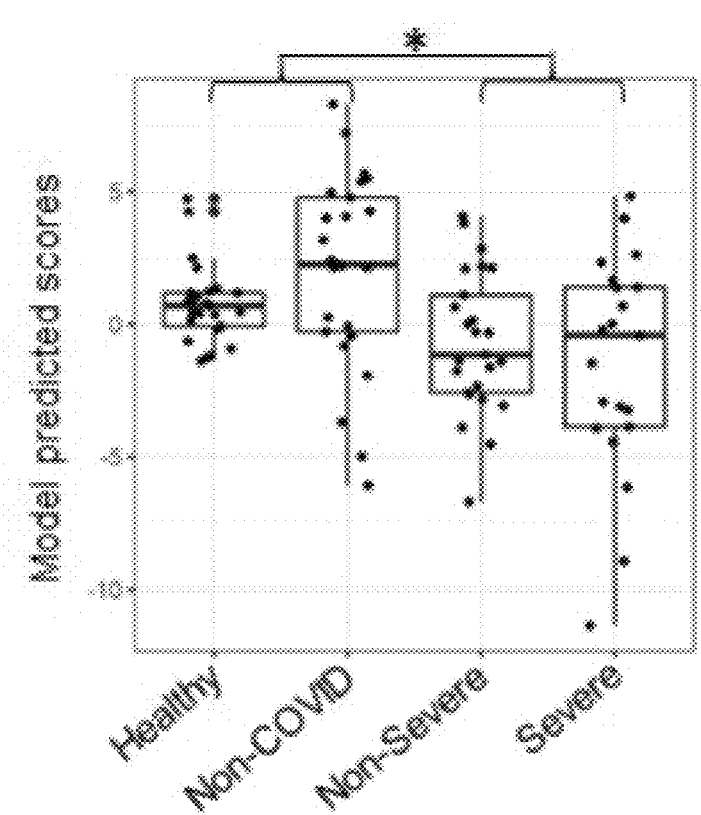

The table summarizes differences in clinical features between (A) all patients at day one and day seven, (B) patients who remained at ICU for more than 14 days (long stay) from those who left before 14 days (short stay) based on measurement on day one or (C) measurement on day seven. Abbreviations: BMI, body mass index; ALP, alkaline phosphatase; ALT, alanine transaminase; AST, aspartate aminotransferase; SpO2%, oxygen saturation; Art pH, arterial pH; PaO2, partial pressure of oxygen; PaCO2, partial pressure of carbon dioxide; RBC, red blood cells; MCHC, mean corpuscular hemoglobin concentration; MCH, mean corpuscular hemoglobin; MPV, mean platelet volume; PDW, platelet distribution width; RDW, red cell distribution width; WBC, white blood cells; ANC, absolute neutrophil count, aPTT, activated partial thromboplastin time; PTT, partial thromboplastin time; CRP, C-reactive protein; APACHE II, a severity-of-disease classification system. Data are presented as mean (SD). Differences between groups were tested by independent sample t-test (normally distributed variables) or Mann-Whitney U (variables with skewed distribution) test. A p-value significance level of 0.05 was used A Multivariate Predictor of Categorized LOS at ICU It is of clinical interest to predict the likely pattern of ICU duration for critically-ill patients on admission. An initial linear model based on measurements taken within 48 h of admission to ICU (day 1) highlighted a strong signature by hypoxanthine and betaine (FIG. 2B). A further analysis of traits and the remaining metabolites with no missing values using the GLMNET statistics followed by model refinement (refer to Methods section) identified hypoxanthine and betaine as the sole best predictors based on the training set (n=17) (FIG. 2C). Both metabolites were lower on day one of sample collection among patients likely to remain at ICU for longer than a 2-week period, and their effects were independent of each other (FIG. 2D). When tested on the prediction set (n=16) (FIG. 2E), the model scored an area under curve (AUC) value of 0.92 (95% CI: 0.76-1) as well as a sensitivity and specificity values of 0.875 and 0.875, respectively (FIG. 2F). Only one out of the eight long-ICU-stay patients was mistakenly assigned to the short-stay category by the model (dashed line, FIG. 2E). The hypoxanthine/betaine model appeared to outperform the APACHE II scores that discriminated short from long ICU state with an AUC value equal to 0.71 (also a sensitivity and specificity measure both equal to 0.4) (FIG. 2G). The model was then tested on published metabolomics data (Shen, et al. (2020) supra). Although the cohort focused on different categories of COVID-19 patients (mild and severe non-ICU patients), the general trend was the same: The predicted scores for the COVID-19 patients (non-severe and severe combined) were significantly less than the average from controls together with the non-COVID-19 patients (p=0.000895) (FIG. 2H). The model, however, did not significantly differentiate the varying COVID-19 severity levels prior to ICU.

We also sought to model the categorized LOS at ICU based on metabolomics measurements on day seven. This model is still predictive since no patient left the ICU before week one. Similar to the previous model, hypoxanthine and betaine were found to be the best explanatory variables of LOS, although the associated AUC value was 0.81 (95% CI: 0.596-1), inferior to that from the previous model.

A Multivariate Predictor of Duration of IMV

Figure 3A:
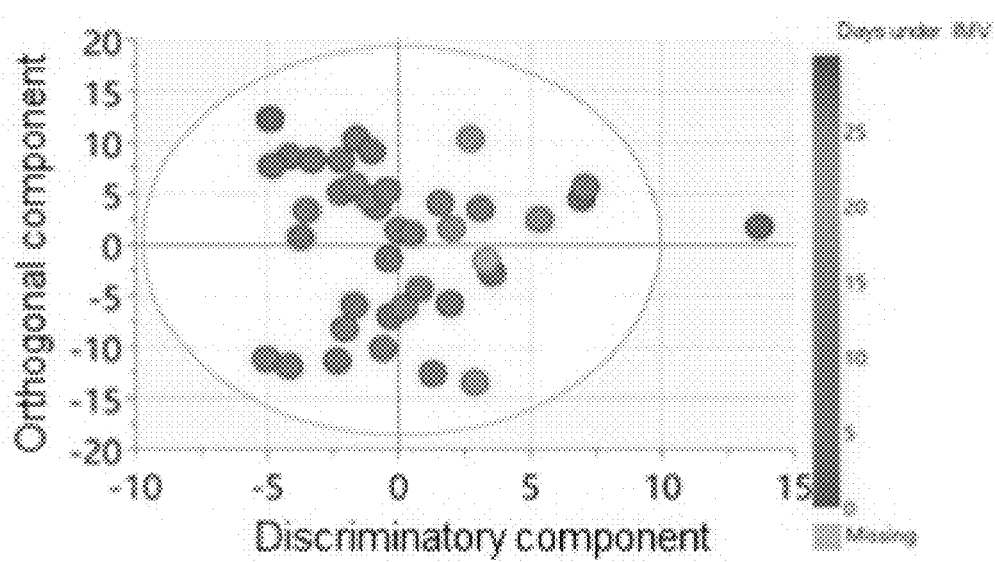
Figure 3B:
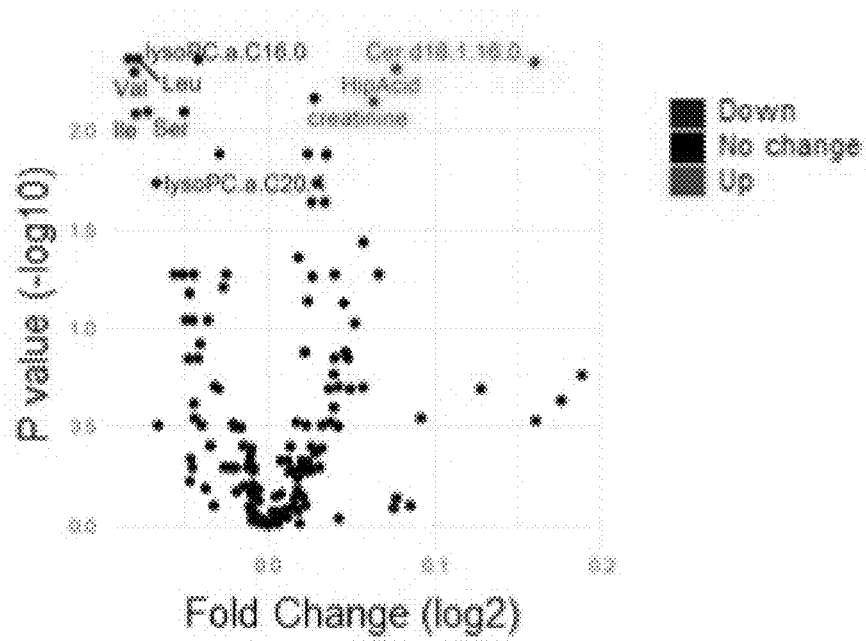
Figure 3C:
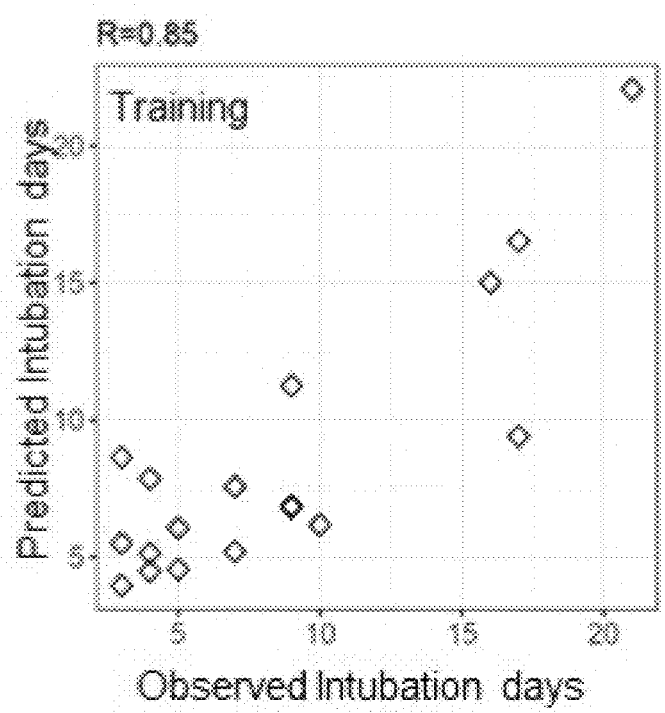
Figure 3D:
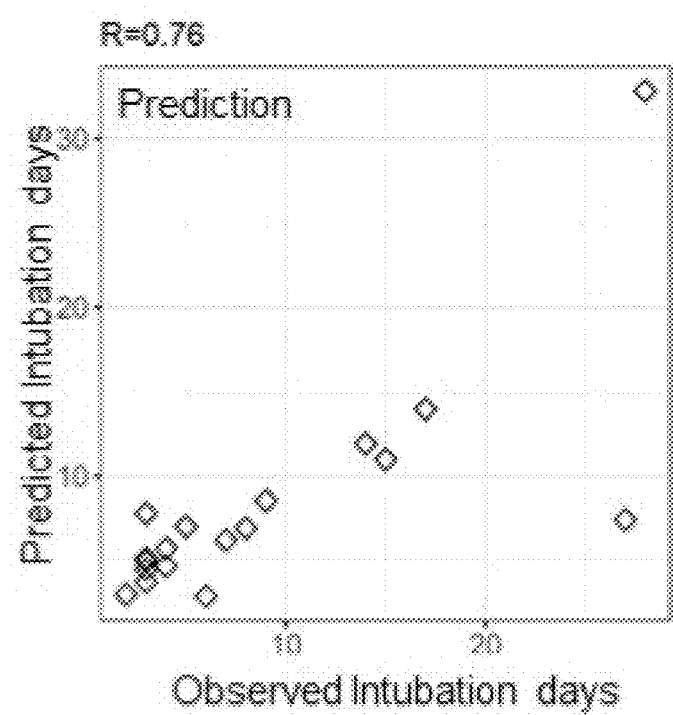
Figure 3E:
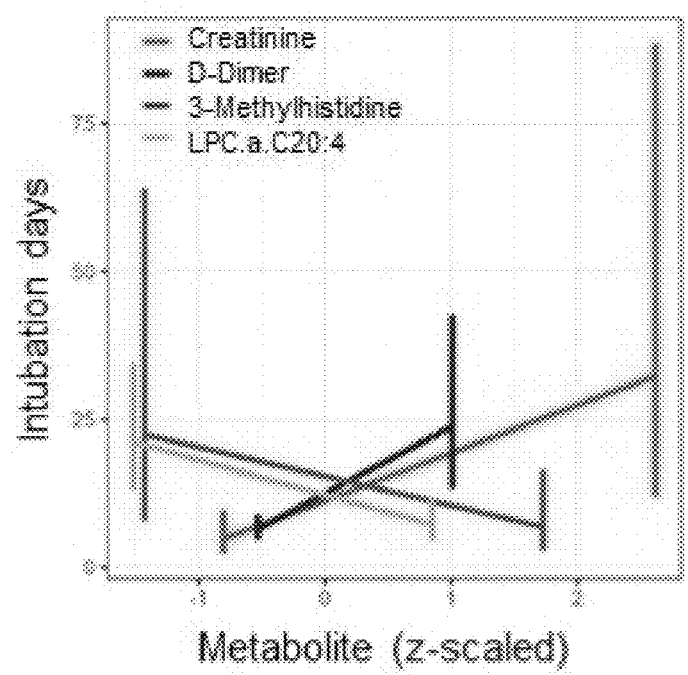
Figure 3F:
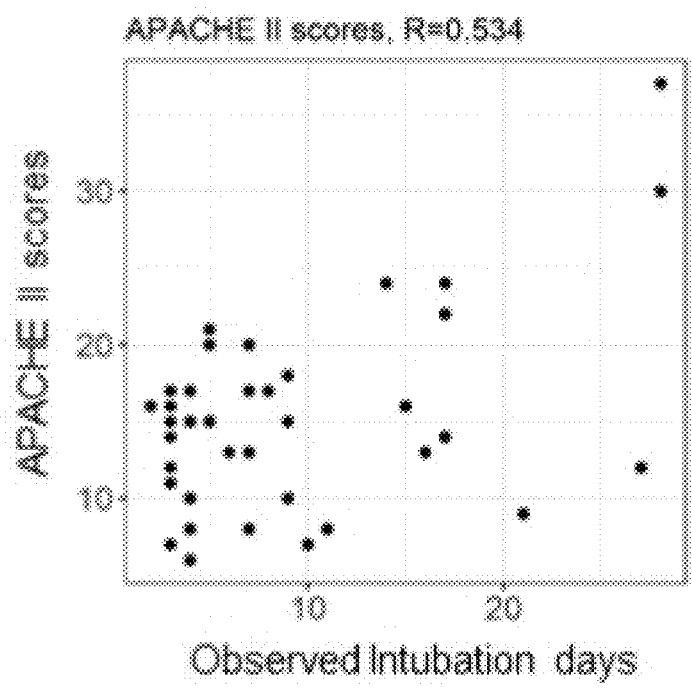
Figure 3G:
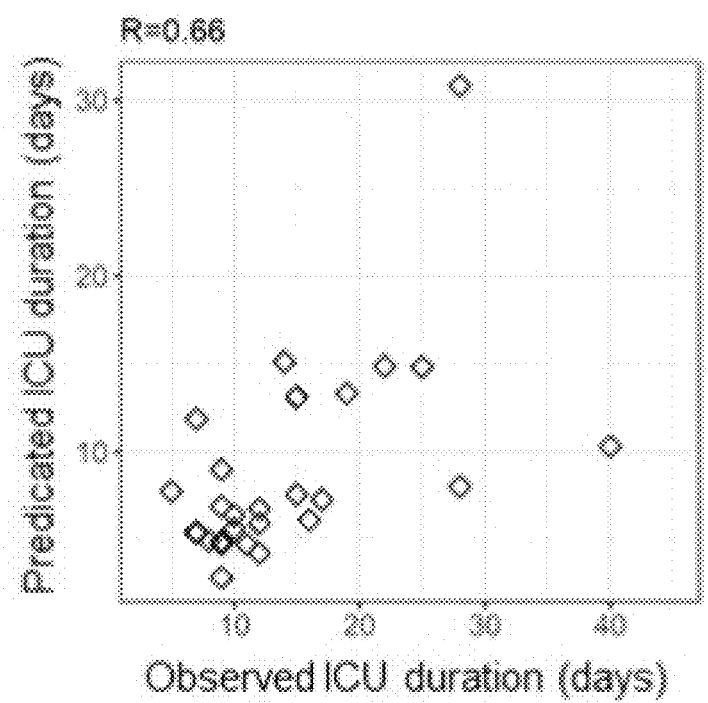

The availability of respiratory ventilators at ICU can be a limiting factor at times of pandemic crisis. The linear model suggested significant associations with Cer.d18.1.16.0, C16.0 Lyso.PC, Var, Leu, Ile, Ser, creatinine, and lysophosphatidylcholine C20:4 (C20.4 LysoPC) (absolute log fold change>0.06 and p≤0.05) measured on day one of sample collection from patients assigned to the training set (FIG. 3B). However, based on the totality of clinical traits and metabolites, the best explanatory subset by the GLMNET analysis (refer to Methods section) was found to include one trait: D-dimer (a fibrin degradation product) and metabolites creatinine and lysophosphatidylcholine C20:4 (C20:4 LysoPC) (both identified as significant from the linear model) in addition to 3-methylhistidine (with a borderline effect) (FIG. 3C). The Pearson correlation (R-value) between the observed and predicted number of days under IMV was 0.85 (p=7.28e-06) and 0.76 (p=0.0006) for the training (n=17) and prediction set (n=16), respectively (FIG. 3C, D). A close examination of the identified explanatory variables revealed an increase in the level of D-dimer as oppose to a decrease in creatinine, 3-methylhistidine, and lysophosphatidylcholine C20:4 levels soon after admission to ICU with longer intubation periods (FIG. 3E). This is superior to the correlation with the APACHE II scores, found equal to 0.53 (p=0.0006) (FIG. 3F). Since the number of days at ICU and under IMV is highly concordant (R=0.7, p=0.0014), we used the same model to predict the former. The correlation level between the observed and predicted days at ICU was 0.66 (p=2.39e-05) (FIG. 3G).

Figure 4A:
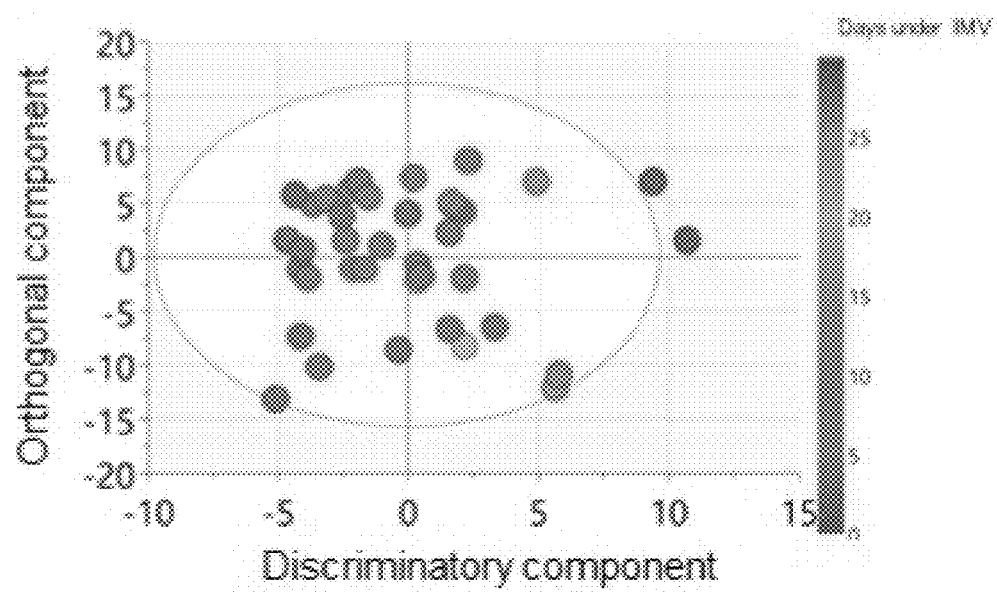
Figure 4B:
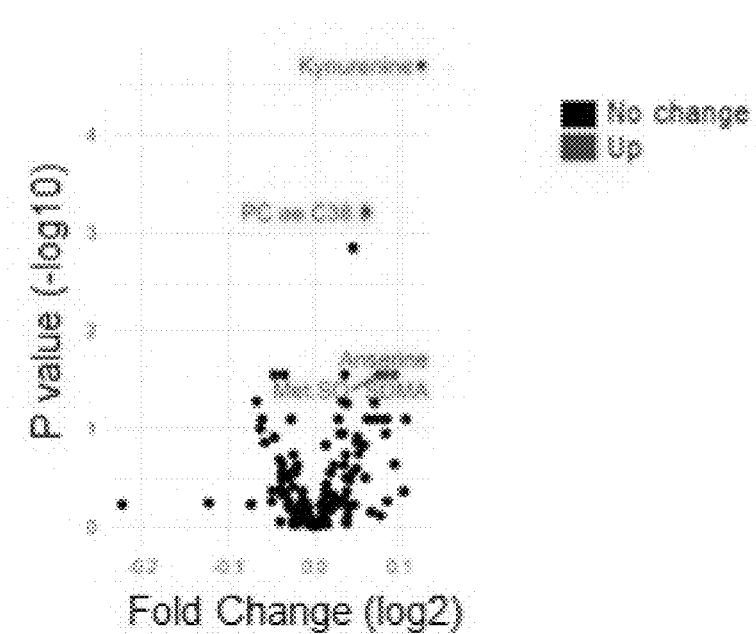
Figure 4C:
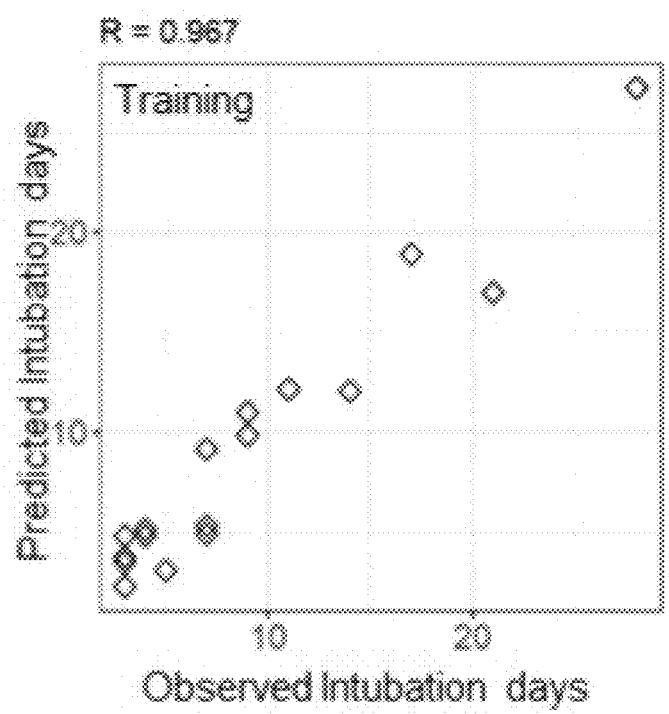
Figure 4D:
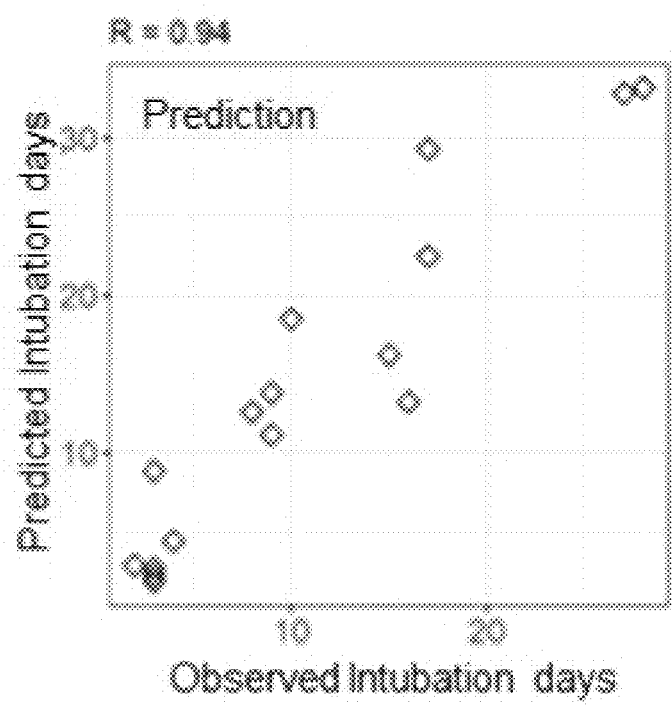
Figure 4E:
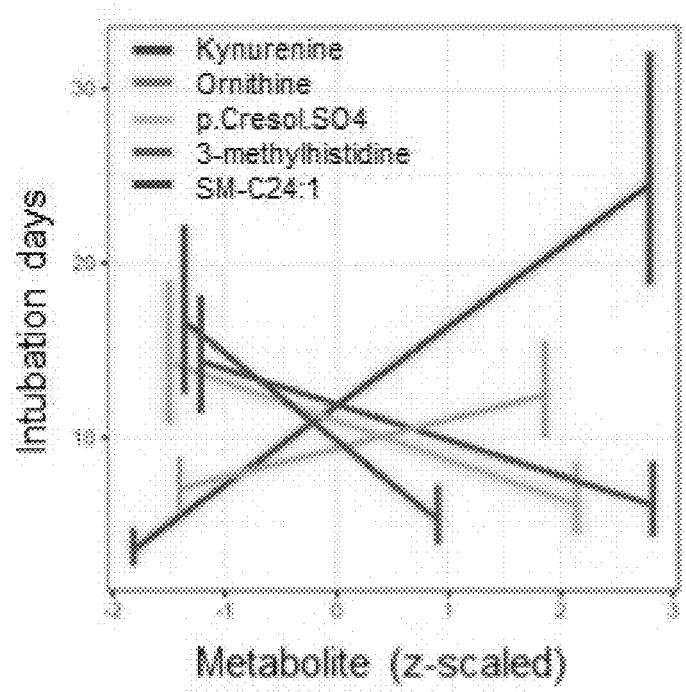
Figure 4F:
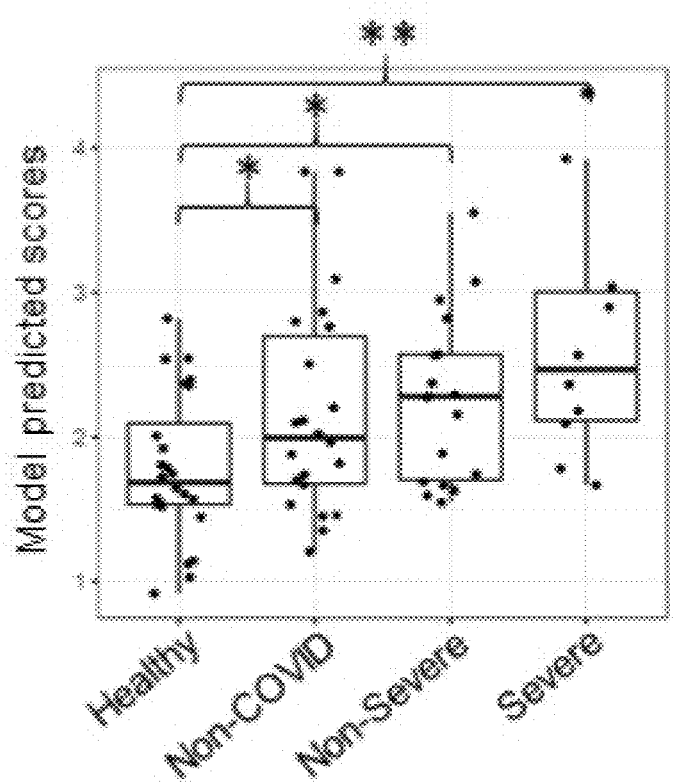
Figure 4G:
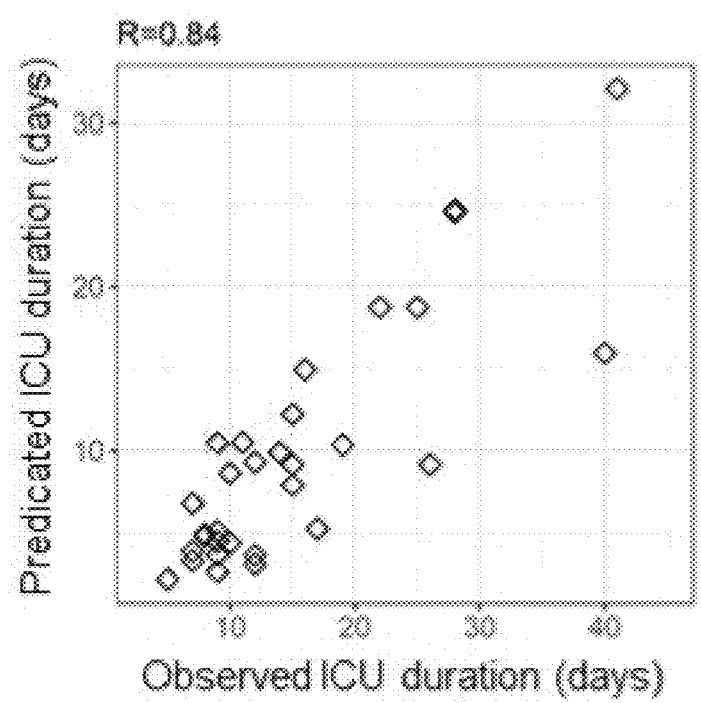
Figure 5A:
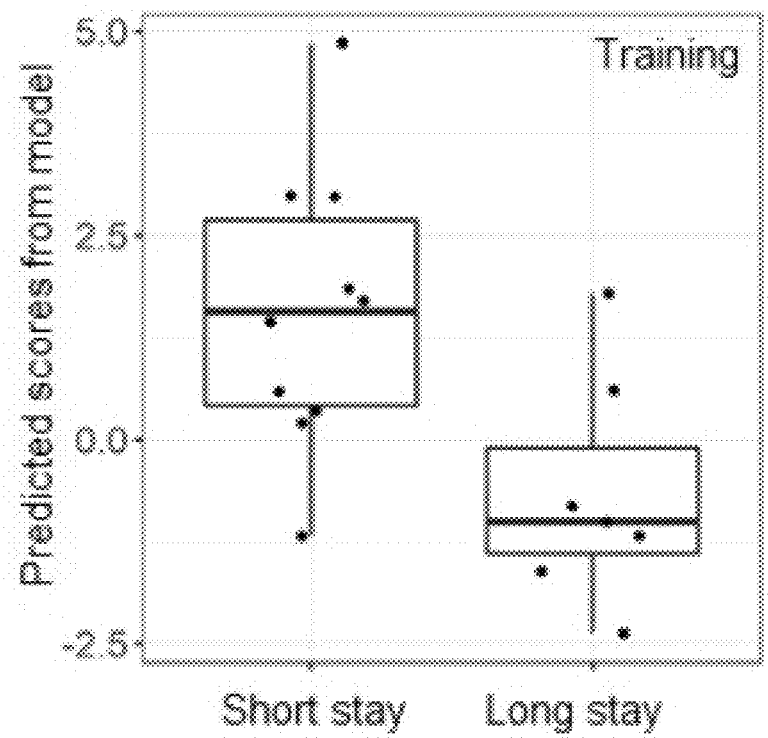
Figure 5B:
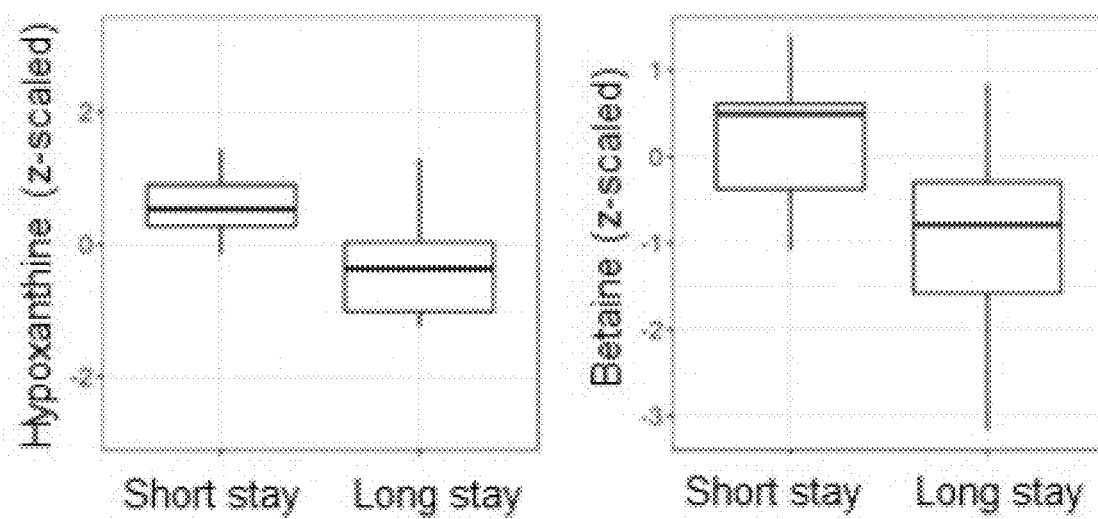
Figure 5C:
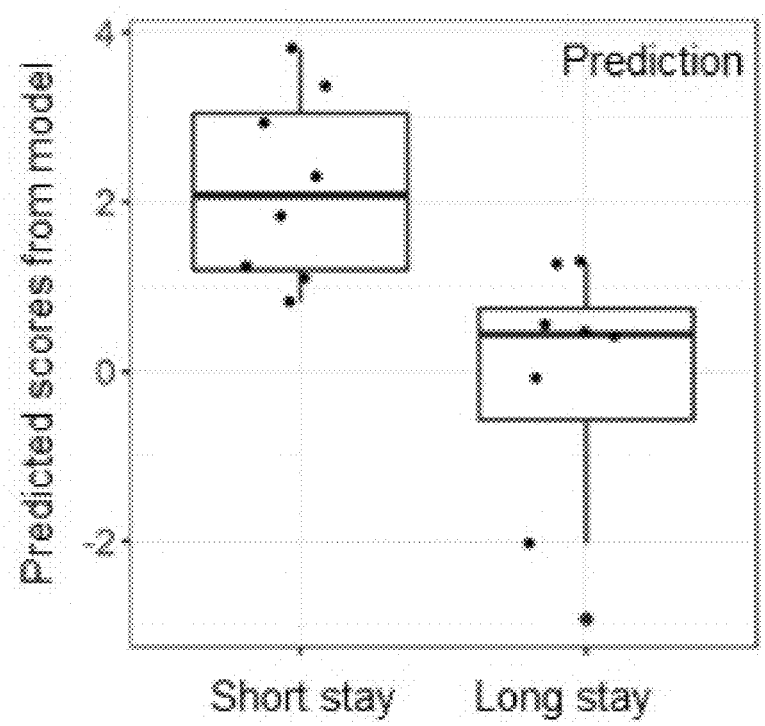
Figure 5D:
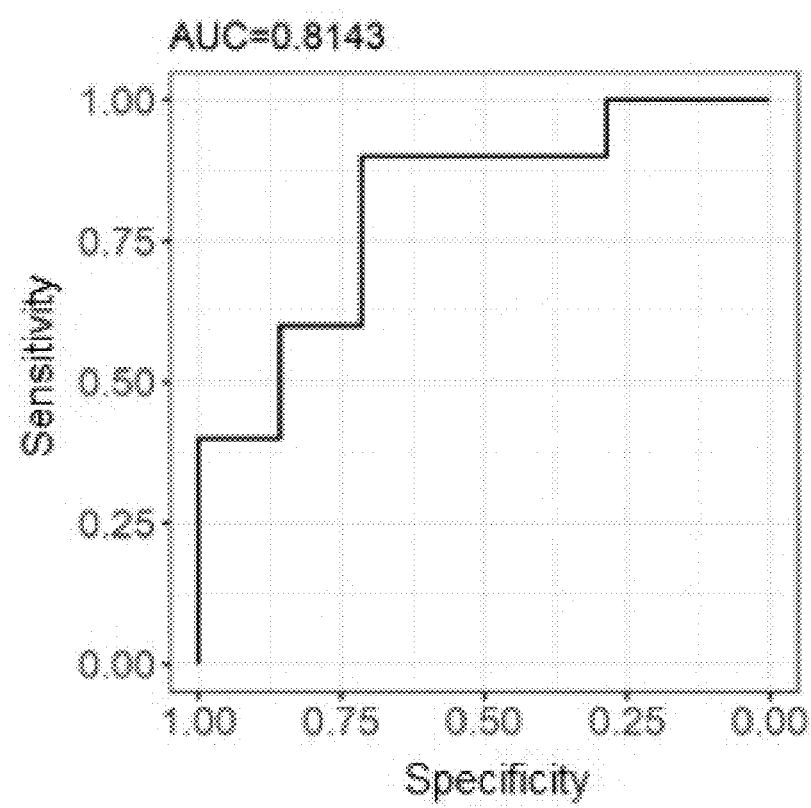

A superior predictive model of the length of IMV was obtained from measurements taken on day seven. The model featured five metabolites but no clinical trait. The metabolites were kynurenine (also highlighted by the linear model statistics, FIG. 4B), 3-methylhistidine, ornithine, p-cresol sulfate, and C24.1 sphingomyelin (FIG. 4C). The observed and predicted intubation days by the model are highly concordant: 0.97 (p=1.39e-10) and 0.94 (p=6.52e-07) for the training and prediction set, respectively (FIG. 4C, D). A close examination revealed an increase in the level of kynurenine and p-cresol sulfate with longer intubation days as opposed to a decline in the levels of the rest of the explanatory variables on day seven (FIG. 4E). The model is superior to its counterpart from measurements taken on day one; however, it is only truly predictive of intubation times longer than 7 days. Interestingly, the model appears to accurately reproduce the severity levels of disease from the published metabolomics study by Shen et al. (2020) supra (FIG. 4F). Taking the severity level of patients (from published data) as an ordinal variable, the association with the model-predicted values was significant (p=0.0004). The predicted scores for the COVID-19 patients (non-severe and severe) were significantly greater than the controls (p=0.028 and p=0.0004, respectively) (FIG. 4F). It is important to note that verification of the statistical model from day one using the published dataset was not possible due to the unavailability of D-dimer measurement. A better prediction of days at ICU was achieved based on the current model with a Pearson correlation value between observed and predicted days equal to 0.84 (p=3.51e-07) (FIG. 4G).

A Multivariate Predictor of ECMO

A model for ECMO treatment was obtained on the cohort after removing the missing values (n=36) due to the small number of ECMO-positive cases among our patients. The model was entirely based on day one measurement since four of our five patients required ECMO within a week following admission to ICU (FIG. 6(A)). It follows that the model was not validated with a prediction set. When accounting for the effect of clinical traits, arterial pH and counts of WBC were jointly found to be the best predictors. Metabolomics measurement offered little improvement into the model's ability to explain the risk of necessitating ECMO (FIG. 6 (B)). In other words, the model was entirely based on the two identified clinical traits, a close examination of which revealed that patients likely to require ECMO are those with lowest levels of arterial pH and highest counts of white blood cells early on ICU admission/intubation. The model requires validation with a separate dataset.

All patents and patent publications referred to herein are hereby incorporated by reference.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. A method for predicting the length of stay (LOS) in an intensive care unit (ICU) for a patient under invasive mechanical ventilation (IMV) and who has COVID-19, or for assessing the risk of a long stay in the ICU for a patient under invasive mechanical ventilation (IMV), the method comprising:
   determining the expression level of at least one metabolite in an isolated biological sample at a first time point, wherein the at least one metabolite is selected from the group consisting of hypoxanthine and betaine, and
   determining whether the at least one metabolite is differentially expressed compared to a reference sample, wherein differential expression of the at least one metabolite is an upregulation or a downregulation,
   wherein differential expression of the metabolite predicts the length of stay for the patient, and
   treating the patient predicted to have a long stay in the ICU or having elevated risk of a long stay in the ICU, with a compound or other therapy to improve the prognosis for the patient and reduce the length of stay.

2. The method of claim 1, wherein the biological sample is obtained within 48 hours of intubation.

3. The method of claim 1, wherein the patient is ill and admitted to the ICU.

4. The method of claim 1, wherein the reference sample is from a patient having a short stay in ICU.

5. A method for predicting the duration of invasive mechanical ventilation (IMV) for a patient who has COVID-19, the method comprising:
   determining the expression level of at least one metabolite in an isolated biological sample at a first time point, wherein the at least one metabolite is selected from the group consisting of kynurenine, 3-methylhistidine, ornithine, p-cresol sulfate, and C24.0 sphingomyelin, and
   determining whether the at least one metabolite is differentially expressed compared to a reference sample, wherein differential expression of the at least one metabolite is an upregulation or a downregulation,
   wherein differential expression of the metabolite predicts the duration of IMV for the patient, and
   treating the patient to reduce the predicted duration of IMV, with a compound or other therapy to improve the prognosis for the patient and reduce the length of stay.

6. The method of claim 5, wherein the patient is ill and admitted to the ICU.

7. The method of claim 5, wherein the reference sample is from an ICU patient intubated for less than one week, or an unintubated ICU patient.

8. The method of claim 5, wherein the biological sample is obtained 1 week after intubation.

9. The method of claim 8, wherein kynurenine and p.Cresol.SO$_4$ are elevated relative to the reference, and the levels of 3-methylhistidine, ornithine, and C24.0 sphingomyelin are lower than the reference.

10. The method of claim 5, wherein the method further comprises predicting if the subject will progress to extracorporeal membrane oxygenation (ECMO).

* * * * *